US012771057B2

(12) United States Patent
Endo et al.

(10) Patent No.: US 12,771,057 B2
(45) Date of Patent: Oct. 20, 2026

(54) ELECTRICAL CONNECTOR CONTAINING RECEPTACLE ASSEMBLY, METALLIC SHELL FOR HOLDING RECEPTACLE ASSEMBLY, AND COVER ATTACHED TO SHELL

(71) Applicant: MITSUMI ELECTRIC CO., LTD., Tokyo (JP)

(72) Inventors: Kazuma Endo, Tokyo (JP); Yuta Takano, Tokyo (JP); Hiroyuki Sadohara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 263 days.

(21) Appl. No.: 18/511,933

(22) Filed: Nov. 16, 2023

(65) Prior Publication Data

US 2024/0186741 A1 Jun. 6, 2024

(30) Foreign Application Priority Data

Dec. 6, 2022 (JP) ................................ 2022-194847

(51) Int. Cl.

*H01R 13/506* (2006.01)
*H01R 13/46* (2006.01)
*H01R 13/6581* (2011.01)

(52) U.S. Cl.

CPC .................................. *H01R 13/506* (2013.01)

(58) Field of Classification Search

CPC ... H01R 13/46; H01R 13/506; H01R 13/6581
USPC ....................................................... 439/733.1
See application file for complete search history.

(56) References Cited

U.S. PATENT DOCUMENTS

| | | | | |
|---|---|---|---|---|
| 8,747,154 | B2 | 6/2014 | Uchiyama | |
| 9,705,229 | B2 * | 7/2017 | Itou | H01R 13/113 |
| 11,710,920 | B2 | 7/2023 | Akaike et al. | |
| 11,764,525 | B2 * | 9/2023 | Endo | H01R 24/40 439/578 |
| 2023/0068741 | A1 * | 3/2023 | Sugiura | H01R 24/40 |

FOREIGN PATENT DOCUMENTS

| | | | |
|---|---|---|---|
| JP | 2013004375 | A | 1/2013 |
| JP | 2022053698 | A | 4/2022 |
| JP | 2022149019 | A | 10/2022 |

OTHER PUBLICATIONS

Japan Patent Office, Office Action Issued in Application No. 2022-194847, Aug. 4, 2026, 6 pages. (Submitted with Machine Translation).

* cited by examiner

*Primary Examiner* — Abdullah A Riyami
*Assistant Examiner* — Thang H Nguyen
(74) *Attorney, Agent, or Firm* — McCoy Russell LLP

(57) ABSTRACT

An electrical connector contains a receptacle assembly, a shell for holding the receptacle assembly, and a cover attached to the shell. The shell includes a body portion for holding the receptacle assembly and a pair of engagement recesses respectively formed on a pair of wall portions of the body portion. The cover includes a body portion, a pair of protruding pieces extending from the body portion toward a base side, and engagement protrusions respectively extending from the pair of protruding pieces toward an inner side. Each of the protruding pieces of the cover has a thick portion and a thin portion having a thickness thinner than a thickness of the thick portion.

8 Claims, 21 Drawing Sheets

ELECTRICAL CONNECTOR CONTAINING RECEPTACLE ASSEMBLY, METALLIC SHELL FOR HOLDING RECEPTACLE ASSEMBLY, AND COVER ATTACHED TO SHELL

CROSS-REFERENCE TO RELATED APPLICATION

The present application claims priority from Japanese Patent Application No. 2022-194847, filed Dec. 6, 2022. The entire contents of the above-listed application are hereby incorporated by reference for all purposes.

TECHNICAL FIELD

The present disclosure generally relates to electrical connectors, in particularly to an electrical connector used for providing a coaxial connection with a coaxial cable.

BACKGROUND ART

In order to provide an electrical connection between an electronic device and another electronic device through a cable, a combination of a receptacle connector and a plug connector has been widely used. Further, an amount of data transmitted from the electronic device to the other electronic device through the cable has increased as processing capacities of the electronic devices has been improved in recent years. In order to transmit a large amount of data in a short time, it is necessary to transmit a high frequency signal through the cable. Thus, there are needs of improving signal transmission characteristics of the cable, particularly, signal transmission characteristics of the cable in a high frequency band. In order to address such needs, a coaxial cable having superior signal transmission characteristics in the high frequency band has been widely used. As is well known, the coaxial cable has a coaxial structure in which a core wire for transmitting a signal, an inner insulator layer covering the core wire, an outer conductor layer (a braid layer) covering the inner insulator layer and serving as a ground earth when the signal is transmitted and a shield for preventing leak of the signal to the outside and penetration of radio waves from the outside and, an outer insulator layer covering the outer conductor layer are concentrically arranged.

In order to provide a coaxial connection with the above-mentioned coaxial cable, there has been widely used an electrical connector including a receptacle assembly containing a contact pin which should be electrically connected to the core wire of the coaxial cable, an insulating housing covering the contact pin and an outer contact which covers the housing and should be connected to the outer conductor layer of the coaxial cable. For example, patent document 1 discloses a receptacle connector 500 for providing coaxial connections with four coaxial cables 600 shown in FIG. 1. The receptacle connector 500 is mounted on a circuit board provided in an arbitrary device. When a plug connector 700 attached to one end portions of the four coaxial cables 600 is inserted into the receptacle connector 500 from a tip side and the receptacle connector 500 and the plug connector 700 are coupled with each other, an electrical connection between the four coaxial cables 600 and the circuit board on which the receptacle connector 500 is mounted is provided through the receptacle connector 500 and the plug connector 700.

As shown in FIG. 2, the receptacle connector 500 includes four receptacle assemblies 510 respectively connected to the four coaxial cables 600 coaxially through the plug connector 700, a metallic shell 520 for holding the four receptacle assemblies 510, and a cover 530 attached to a tip side portion of the shell 520 to guide coupling between the plug connector 700 and the receptacle connector 500. The cover 530 is configured to mate with a cover 710 (see FIG. 1) of the plug connector 700. As shown in FIG. 1, by inserting the cover 710 of the plug connector 700 into the cover 530 of the receptacle connector 500, it is possible to provide the connection between the plug connector 700 and the receptacle connector 500 with ensuring coaxialities between the four coaxial cables 600 and the four receptacle assemblies 510.

Referring back to FIG. 2, the shell 520 includes an engagement portion 521 formed on an outer surface of each of a pair of opposing side walls. The engagement portion 521 has a slope shape whose height (a length in the X direction) gradually increases from the tip side toward the base side. A tip end surface of the engagement portion 521 is an inclined surface. A base end surface of the engagement portion 521 is a flat surface perpendicular to an insertion and extraction direction of the plug connector 700 (the Z direction). On the other hand, the cover 530 includes a cylindrical body portion 531, a pair of protruding pieces 532 respectively extending from base end portions of a pair of side walls of the body portion 531 toward the base side, and engagement holes 533 respectively formed in the pair of protruding pieces 532.

The shell 520 is inserted into the cover 530 in order to attach the cover 530 to the shell 520. At this time, the pair of protruding pieces 532 of the cover 530 slide on the tip end surfaces of the pair of engagement portions 521 of the shell 520. Since the tip end surfaces of the engagement portions 521 are inclined, the pair of protruding pieces 532 can respectively slide on the pair of engagement portions 521, and the pair of protruding pieces 532 are elastically deformed so as to be opened toward the outer side. After that, when the engagement holes 533 of the pair of protruding pieces 532 exceed the pair of engagement portions 521, the pair of protruding pieces 532 are closed. With this snap fit, the engagement holes 533 and the engagement portions 521 are engaged with each other, and thus the cover 530 is locked with respect to the shell 520.

During the above-mentioned attachment operation for attaching the cover 530 to the shell 520, it is necessary to insert the shell 520 into the cover 530 with strong insertion force. Thus, there is a problem that a strong load is applied to the cover 530 and the shell 520 during the attachment operation, and the strong load causes deformation or damage of the cover 530 or the shell 520. In particular, there is a problem that the pair of protruding pieces 532 cannot withstand the applied load and are bent or broken when the pair of protruding pieces 532 of the cover 530 are opened toward the outer side.

RELATED ART DOCUMENT

Patent Document

Patent document 1: JP 2022-149019A

SUMMARY OF THE INVENTION

Problem to be Solved by the Invention

The present disclosure has been made in view of the above-described problems of the conventional art. Accordingly, it is an object of the present disclosure to provide an electrical connector which can reduce the insertion force required when attaching the cover to the shell with keeping holding force of the cover with respect to the shell by improving elasticities of the pair of protruding pieces of the cover.

Means for Solving the Problem

The above object is achieved by the present disclosure defined by the following (1).

(1) An electrical connector which can be coupled with a mating connector inserted from a tip side, comprising:

a receptacle assembly including a contact pin, an insulating housing for containing the contact pin therein, and a metallic outer contact for covering the housing;

a metallic shell for holding the receptacle assembly; and a cover attached to the shell for guiding coupling between the electrical connector and the mating connector, wherein the shell includes a body portion for holding the receptacle assembly and a pair of engagement recesses respectively formed on a pair of wall portions of the body portion, wherein the cover includes a cylindrical body portion, a pair of protruding pieces respectively extending from a pair of wall portions of the body portion toward a base side and engagement protrusions respectively extending from the pair of protruding pieces toward an inner side, wherein the cover is attached to the shell by respectively engaging the engagement protrusions of the cover with the pair of engagements recesses of the shell, and wherein each of the pair of protruding pieces of the cover has a thick portion and a thin portion whose thickness is thinner than a thickness of the thick portion.

Effect of the Invention

In the electrical connector of the present disclosure, the thin portion is formed on each of the protruding pieces of the cover. By forming the thin portion in each of the protruding pieces, it is possible to improve elasticities of the pair of protruding pieces. Therefore, it is possible to reduce the insertion force required when attaching the cover to the shell with keeping the holding force of the cover with respect to the shell.

DETAILED DESCRIPTION

Figure 1:
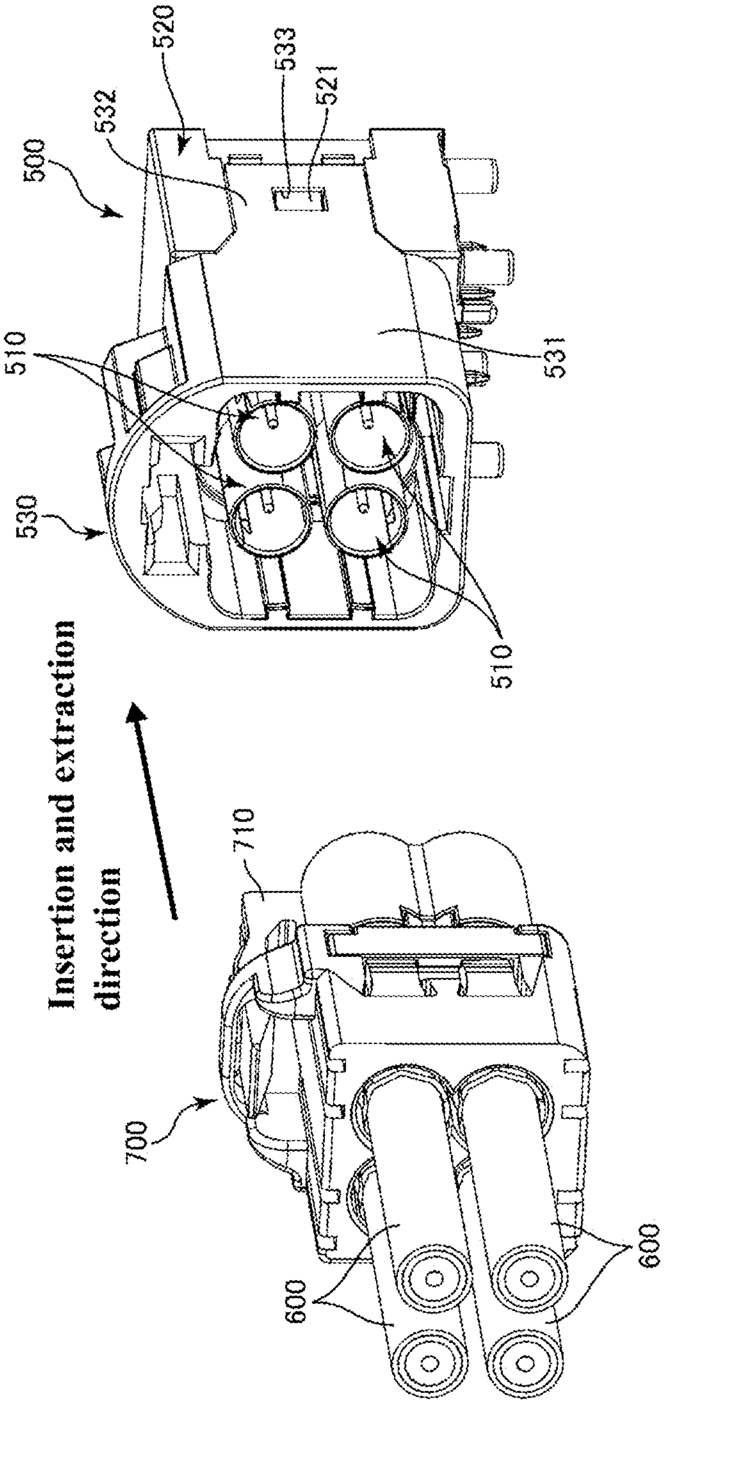
Prior art Fig. 1
FIG. 1 is a perspective view showing a receptacle connector and a plug connector of the prior art.
Figure 2:
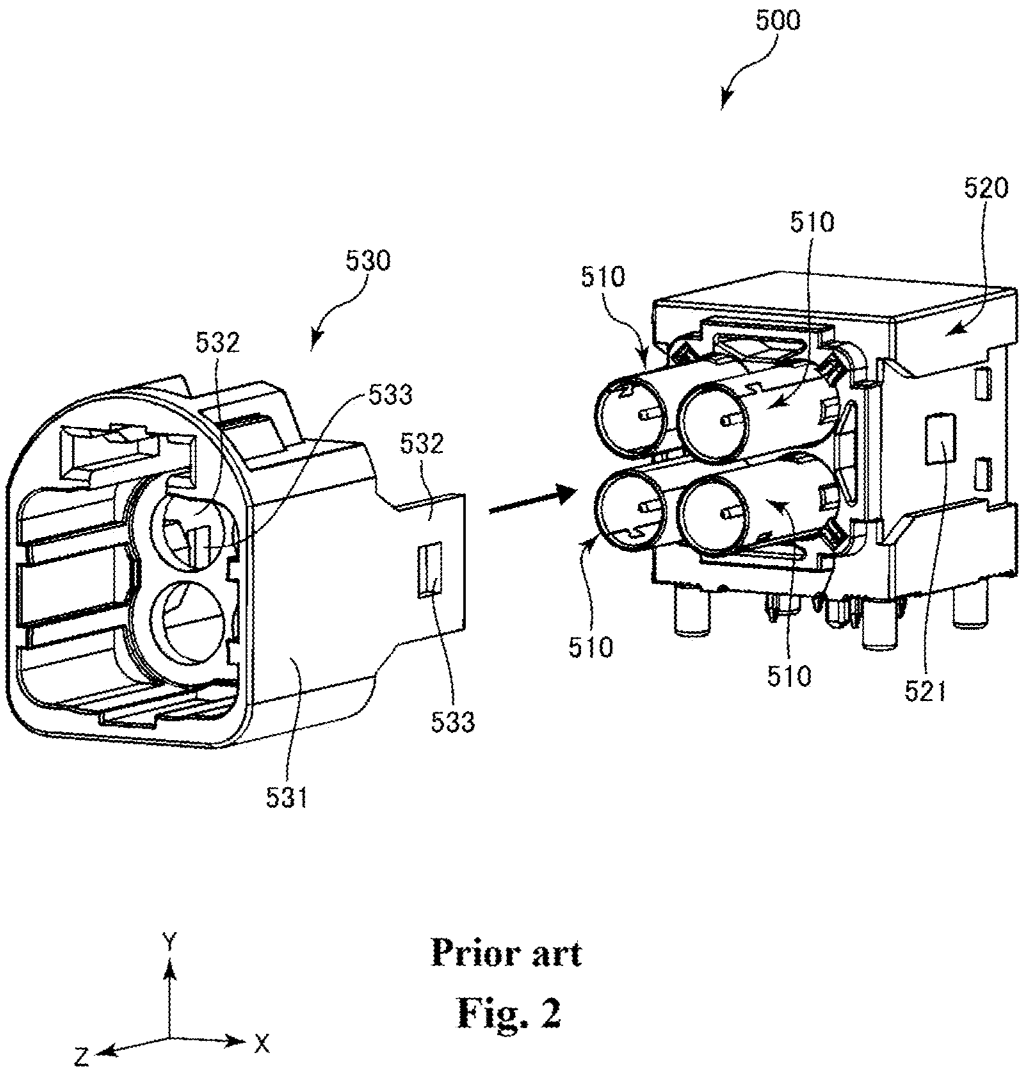
Prior art Fig. 2
FIG. 2 is a view for explaining an attachment operation of the receptacle connector shown in FIG. 1 for attaching a cover to a shell.

Hereinafter, description will be given to an electrical connector of the present disclosure based on a preferred embodiment shown in the accompanying drawings. In this regard, the drawings referenced in the following description are schematic views prepared for explaining the present disclosure. A dimension (such as a length, a width and a thickness) of each component shown in the drawings is not necessarily identical to an actual dimension. Further, the same reference numbers are used throughout the drawings to refer to the same or like elements. In the following description, a positive direction of the Z axis in each figure may be referred to as a "tip side" or a "front side", a negative direction of the Z axis in each figure may be referred to as a "base side" or a "rear side", a positive direction of the Y axis in each figure may be referred to as an "upper side", a negative direction of the Y axis in each figure may be referred to as a "lower side", a positive direction of the X axis in each figure may be referred to as a "near side", and a negative direction of the X axis may be referred to as a "far side" in each figure. In addition, the Z direction may be referred to as an "insertion and extraction direction of the mating connector", the Y direction may be referred to as a "height direction", and the X direction may be referred to as a "width direction".

Figure 3:
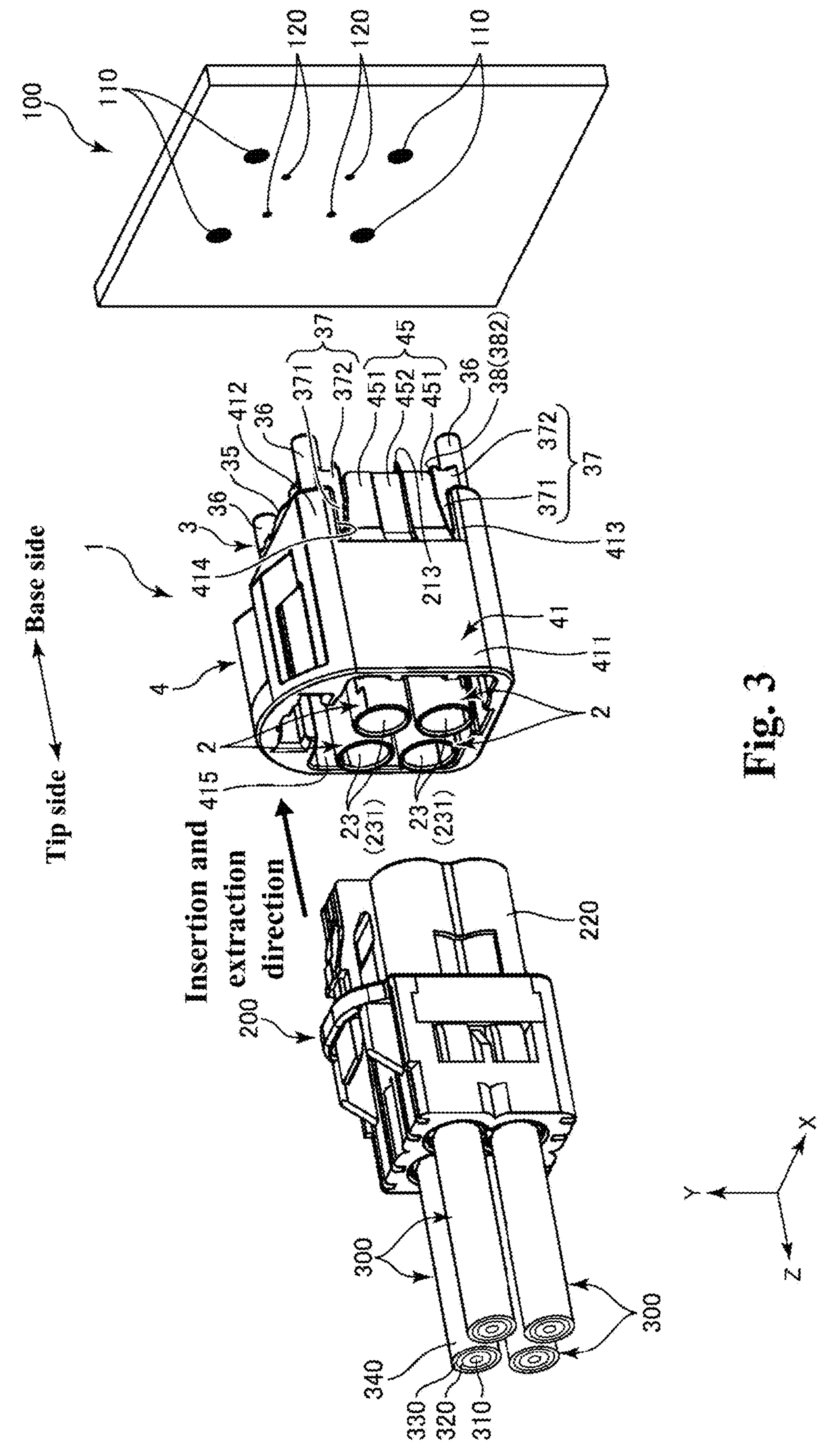
FIG. 3 is a perspective view showing an electrical connector of the present disclosure, a circuit board on which the electrical connector of the present disclosure should be mounted, and a mating connector to be coupled with the electrical connector of the present disclosure.
Figure 4:
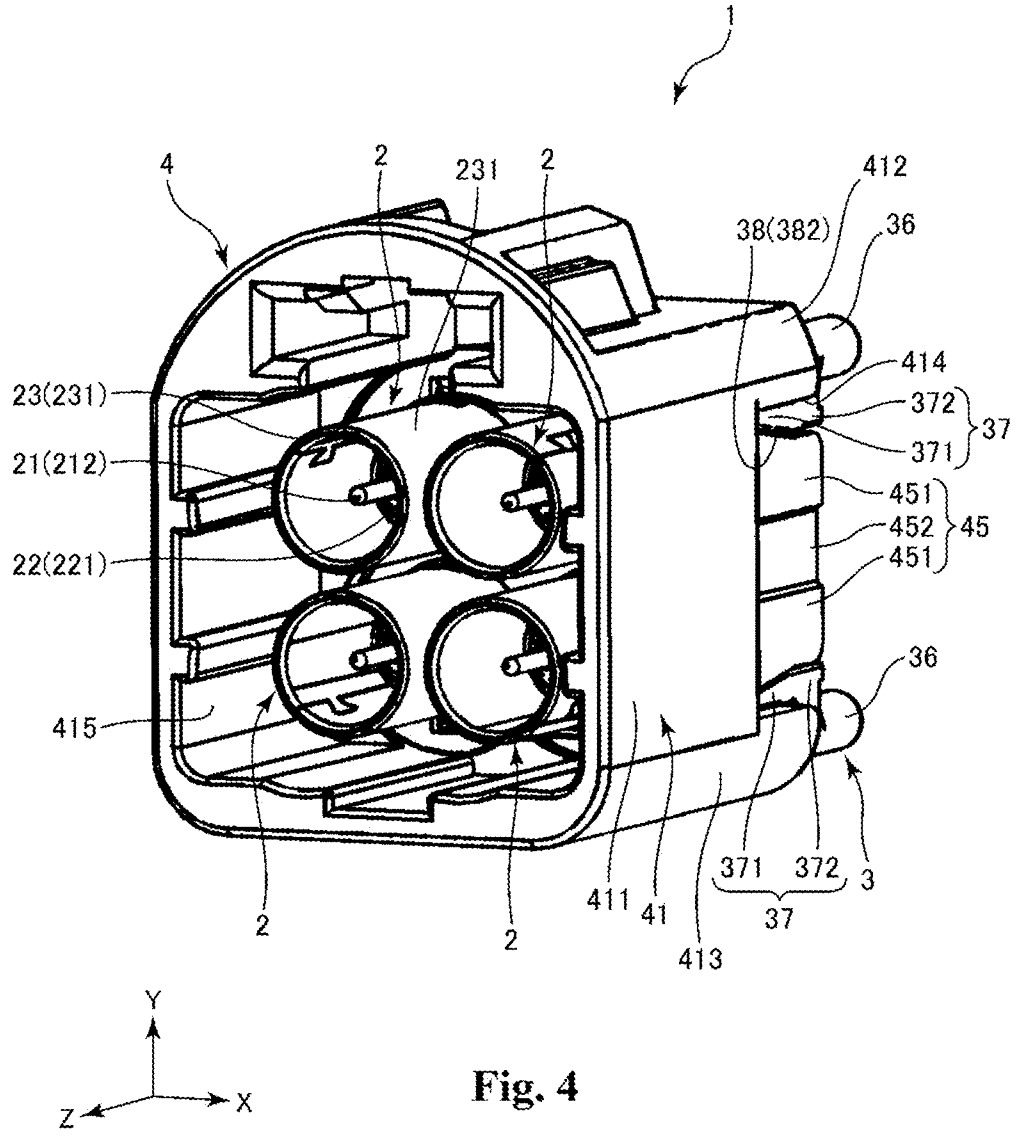
FIG. 4 is a perspective view of the electrical connector shown in FIG. 3.
Figure 5:
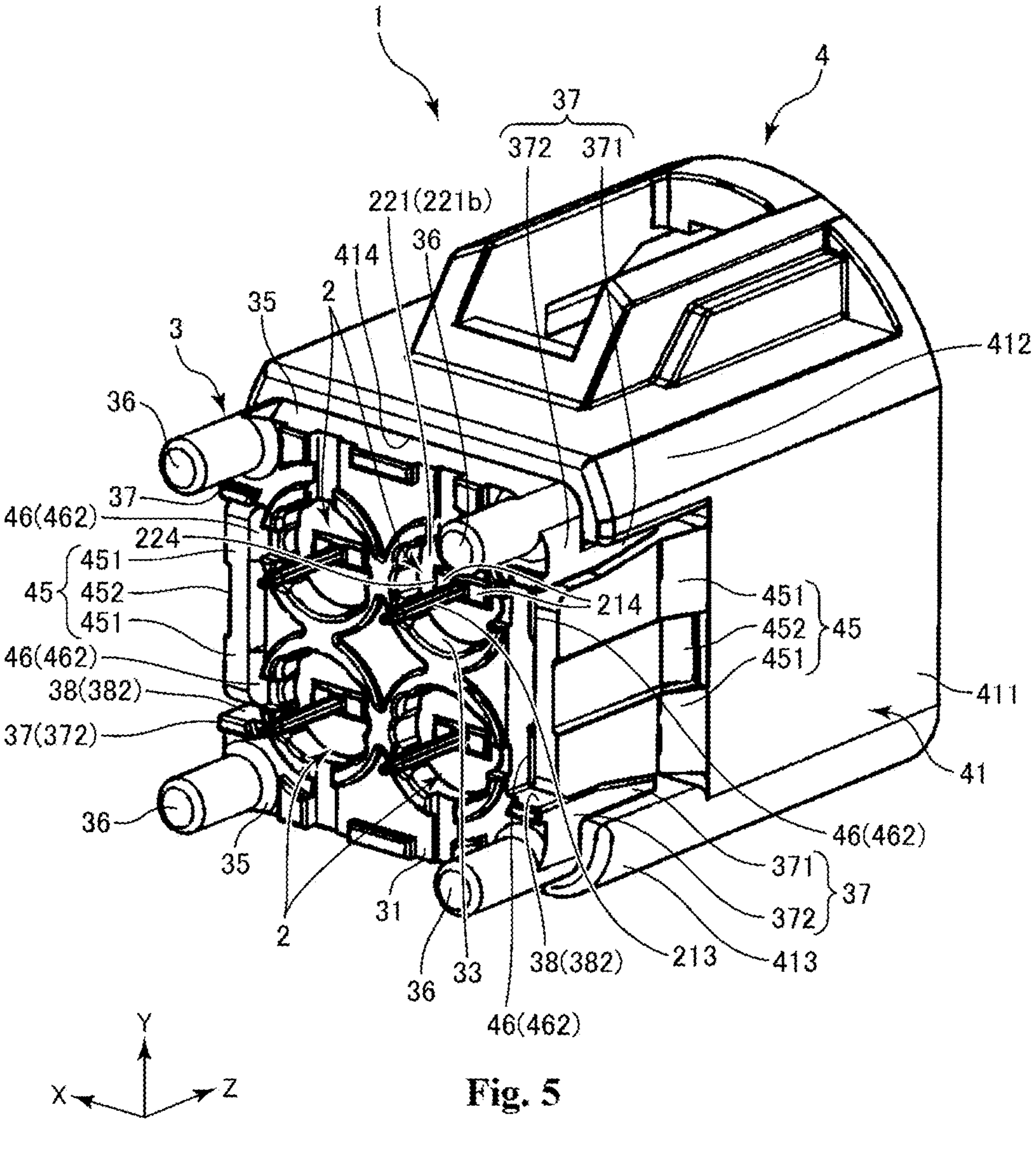
FIG. 5 is a perspective view showing the electrical connector shown in FIG. 3 from another angle.
Figure 6A:
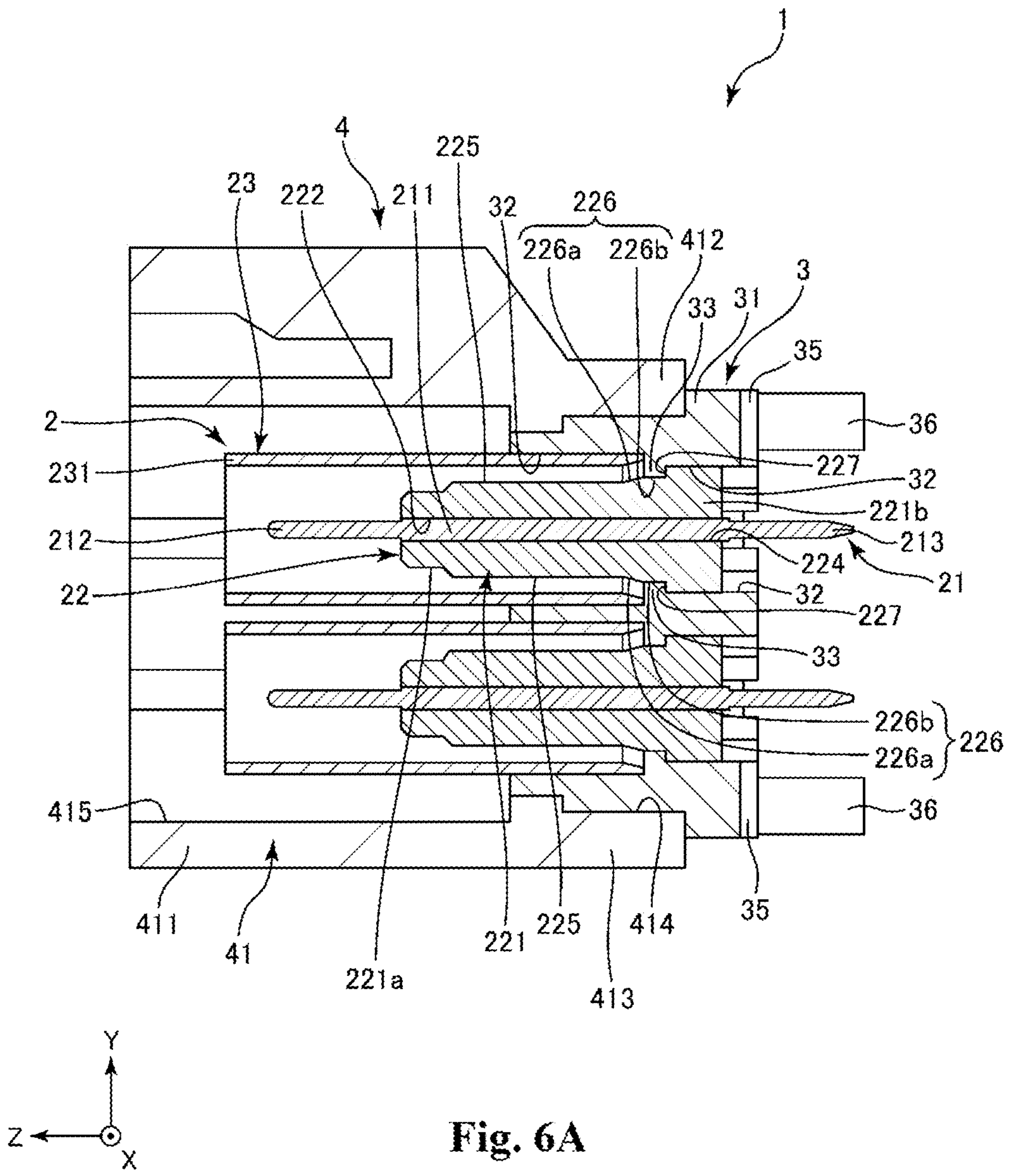
FIG. 6A is a cross-sectional view along a YZ plane including a contact pin of the electric connector.
Figure 6B:
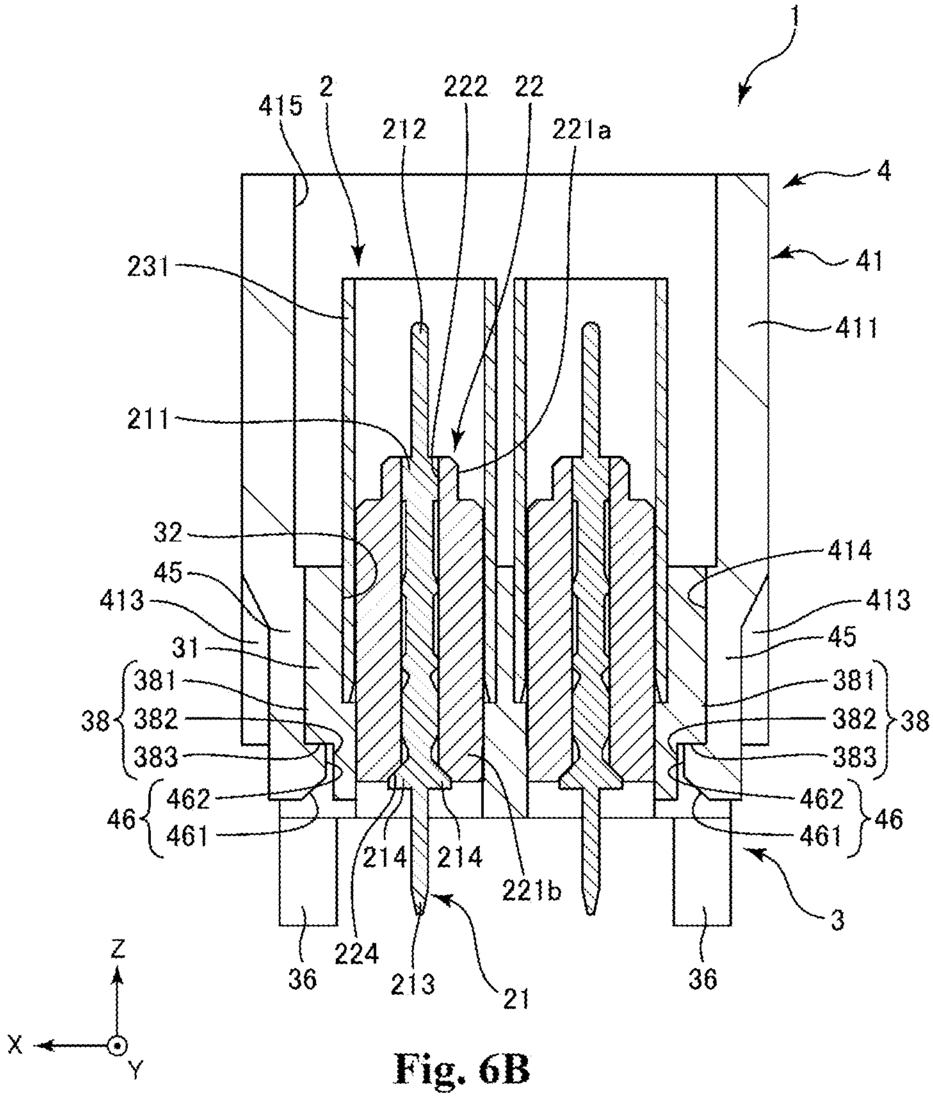
FIG. 6B is a cross-sectional view along an XZ plane including the contact pin of the electric connector.
Figure 7:
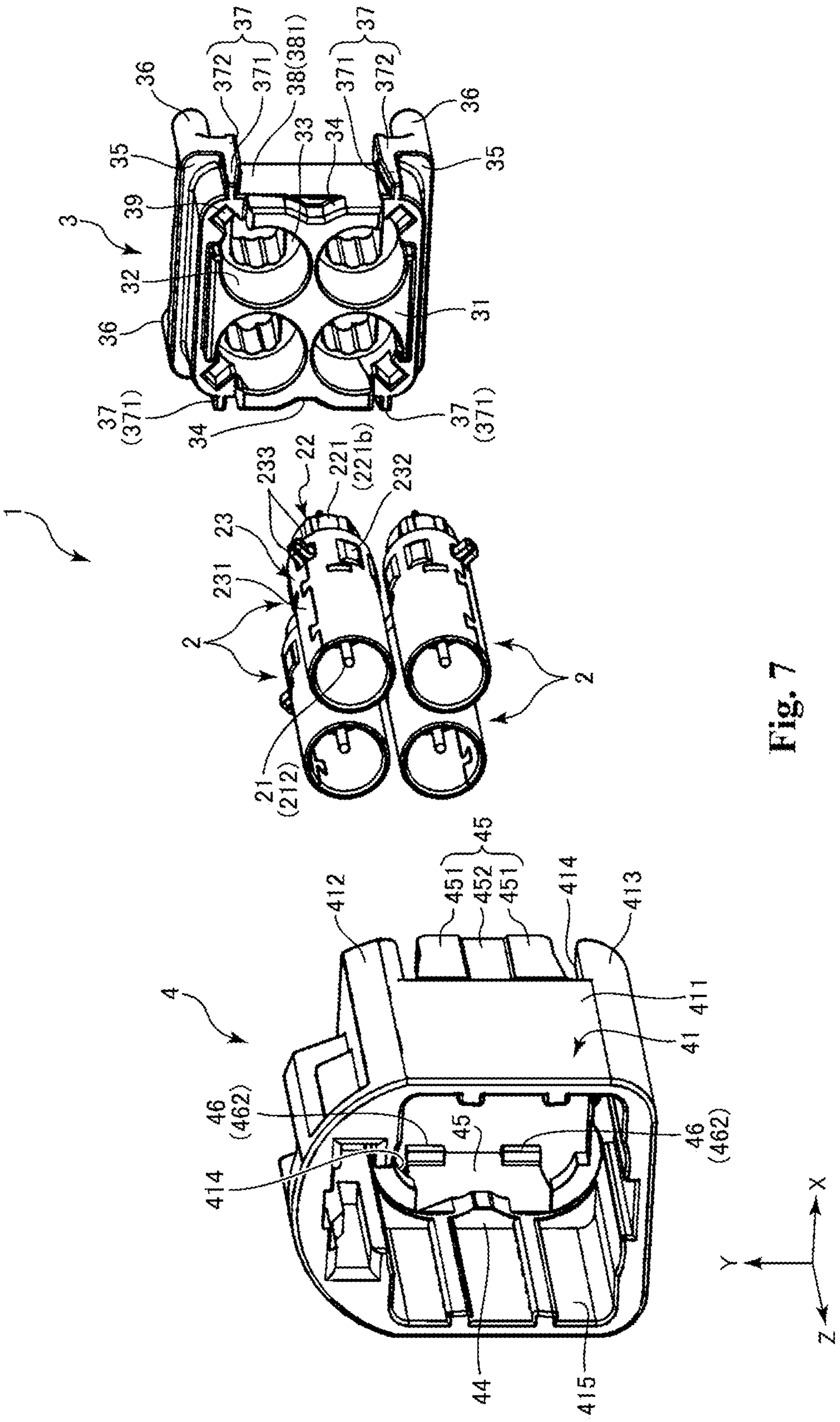
FIG. 7 is an exploded perspective view of the electrical connector shown in FIG. 3.
Figure 8:
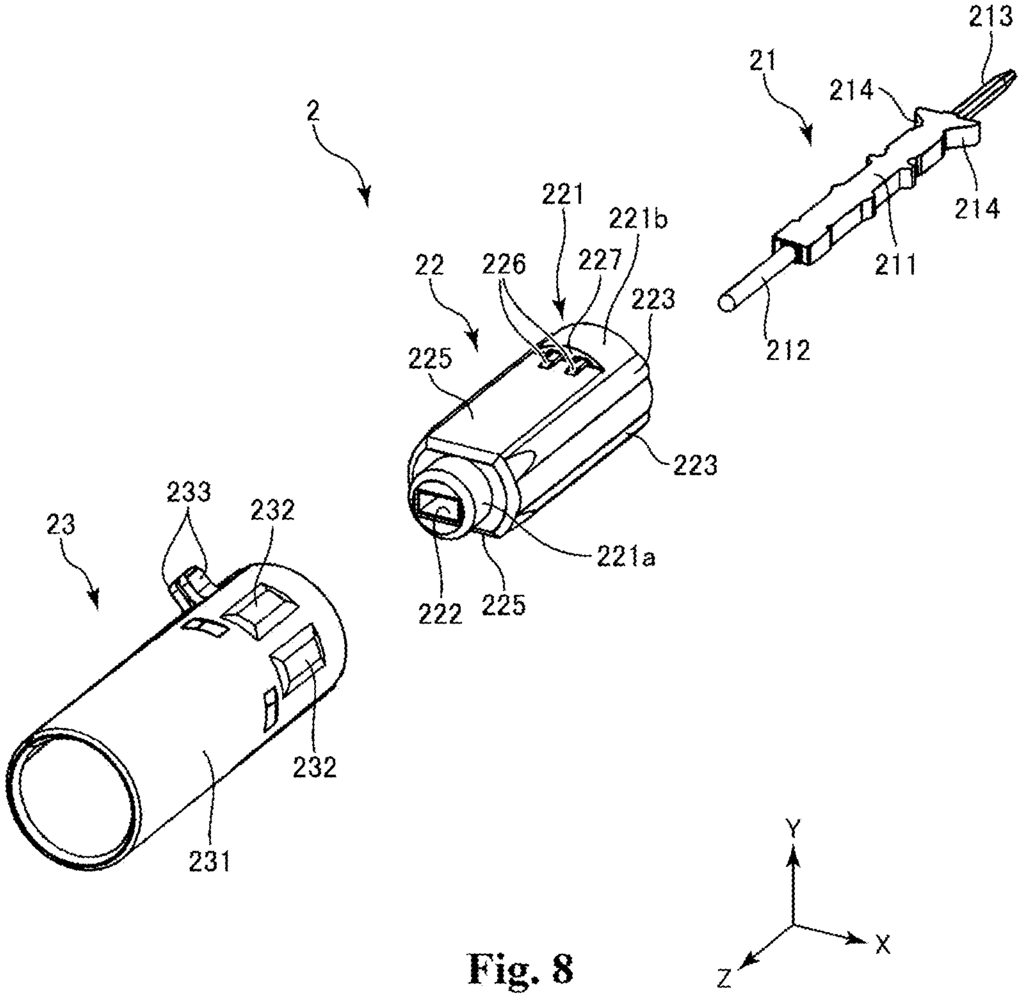
FIG. 8 is an exploded perspective view of a receptacle assembly shown in FIG. 7.
Figure 9:
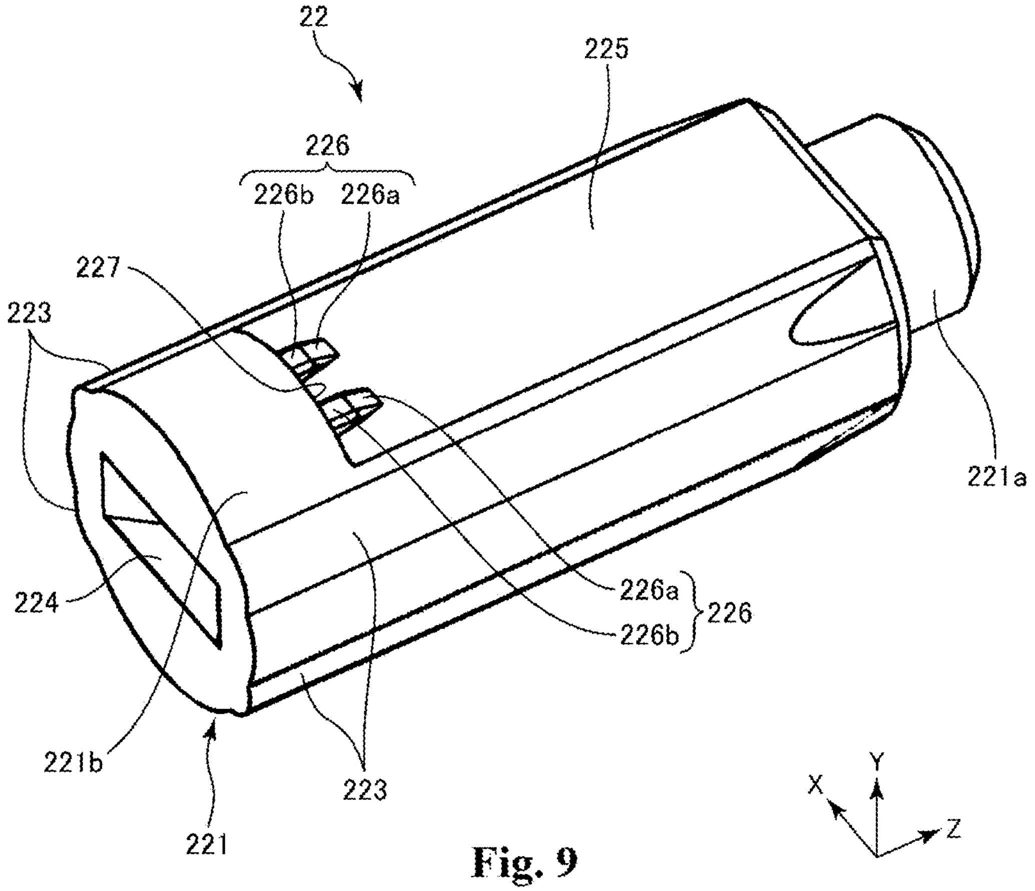
FIG. 9 is a perspective view showing a housing shown in FIG. 8 from another angle.
Figure 10:
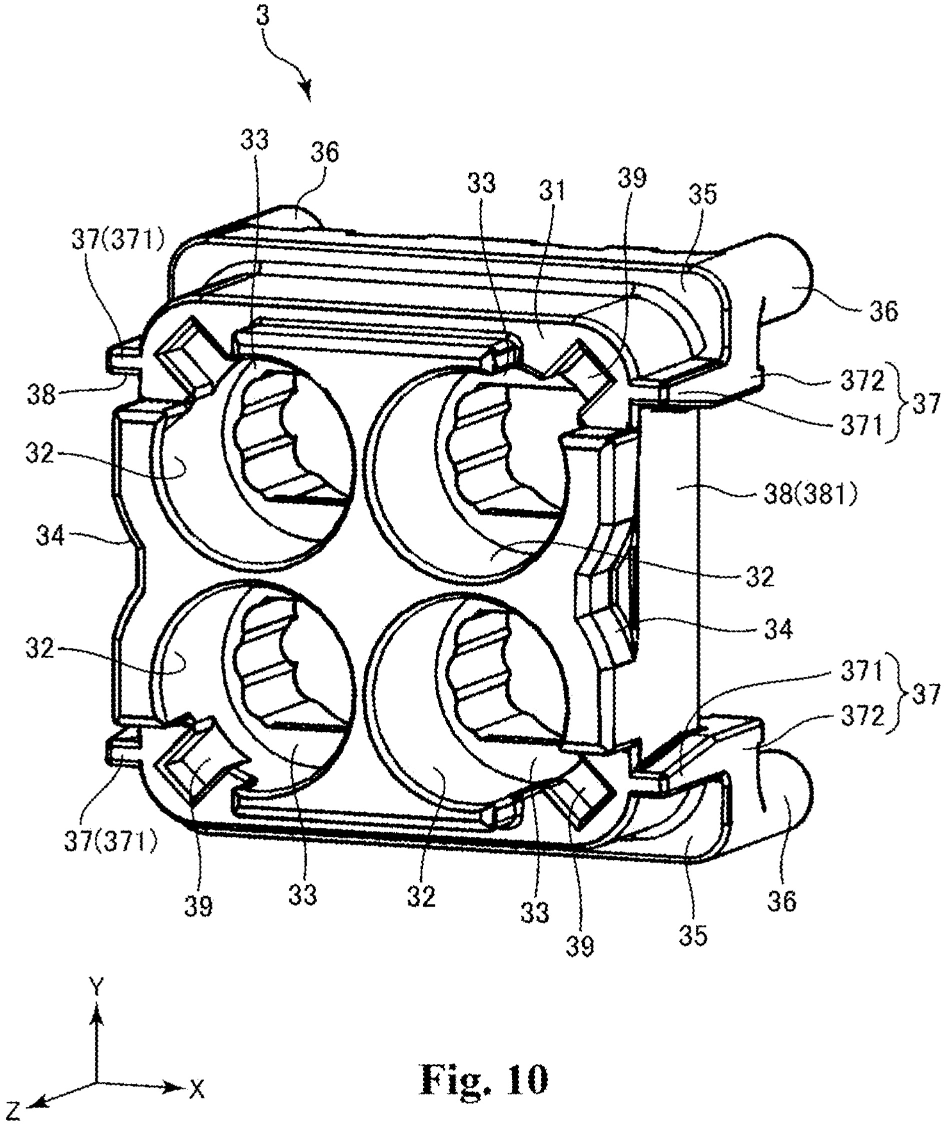
FIG. 10 is a perspective view of a shell shown in FIG. 7.
Figure 11:
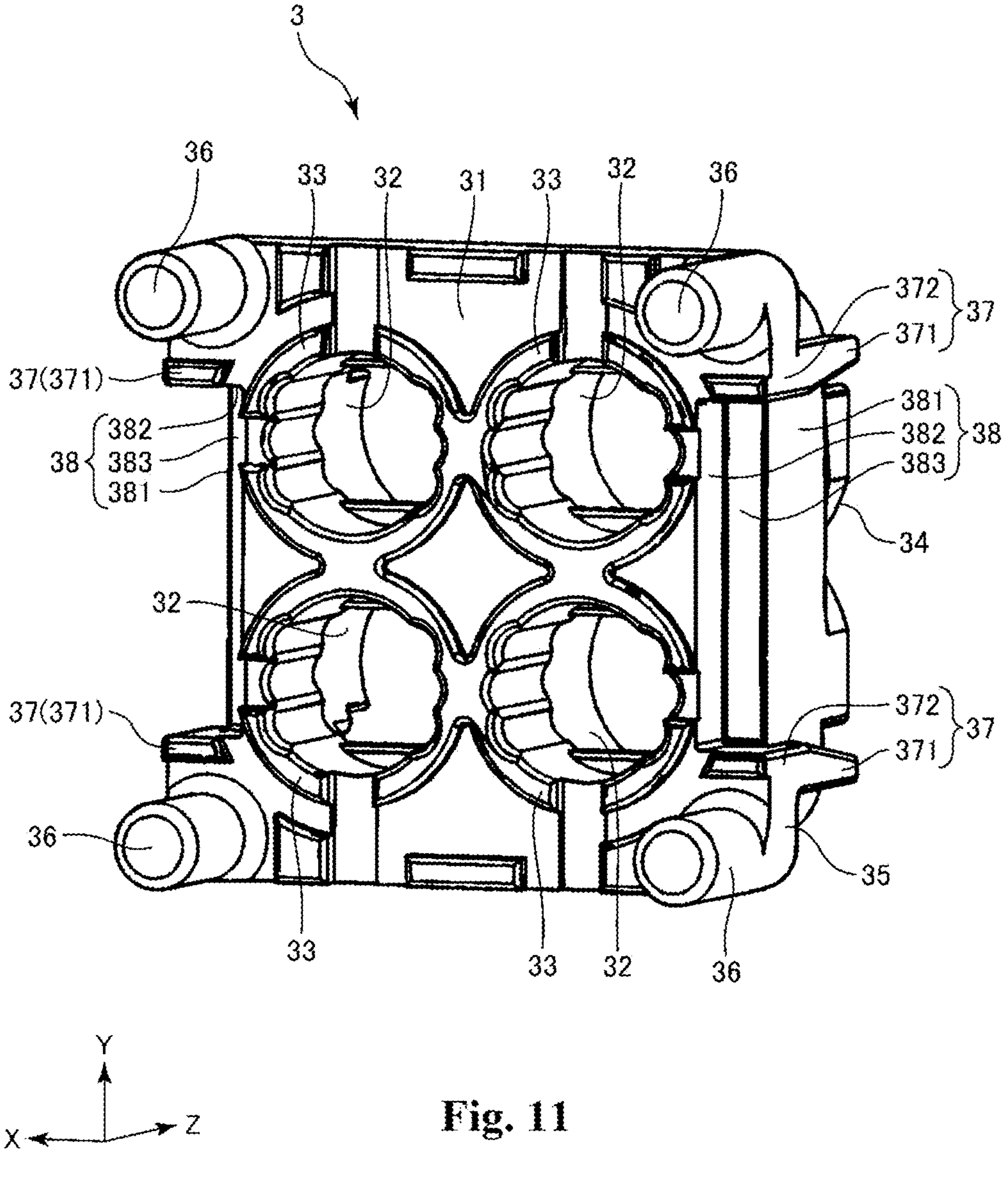
FIG. 11 is a perspective view showing the shell shown in FIG. 7 from another angle.
Figure 12:
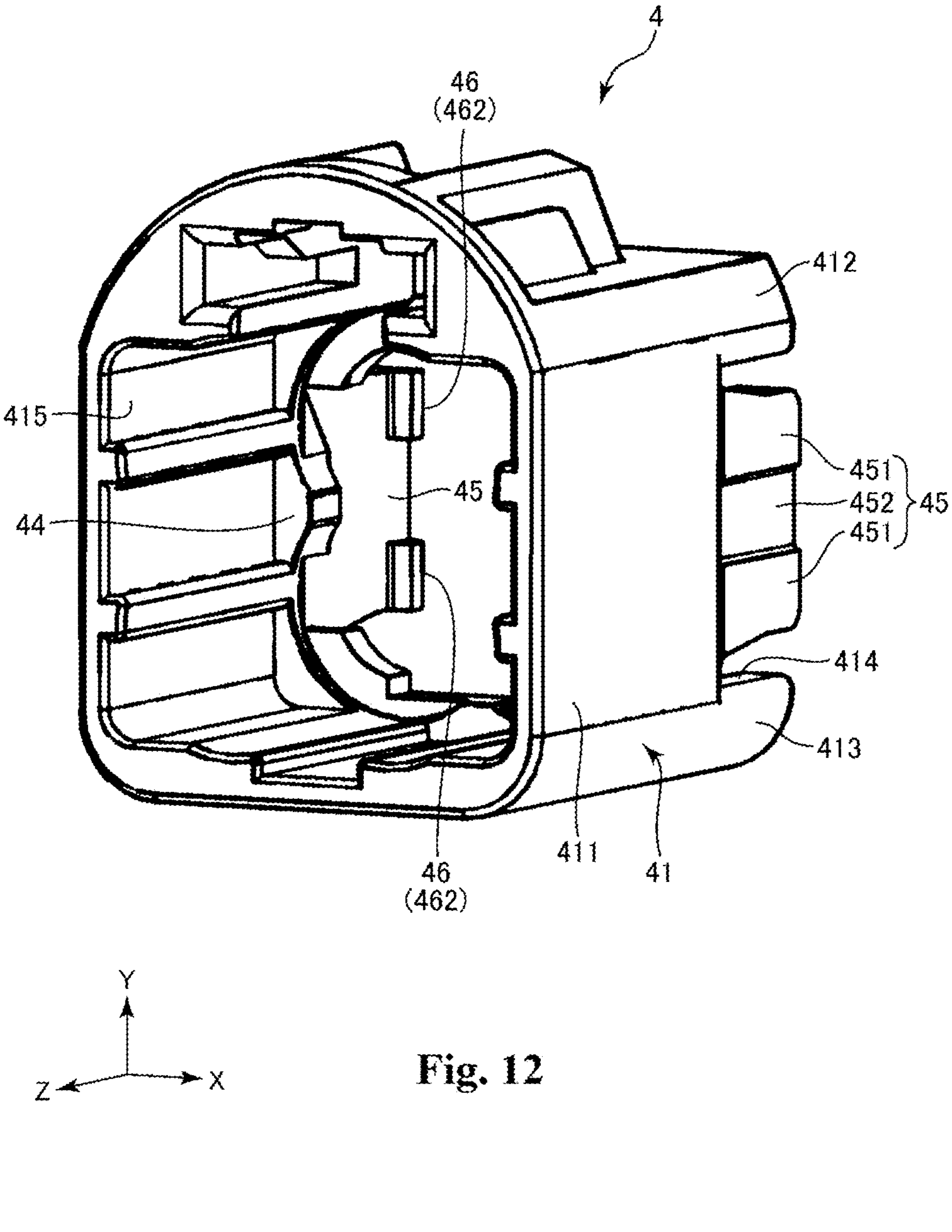
FIG. 12 is a perspective view of a cover shown in FIG. 7.
Figure 13:
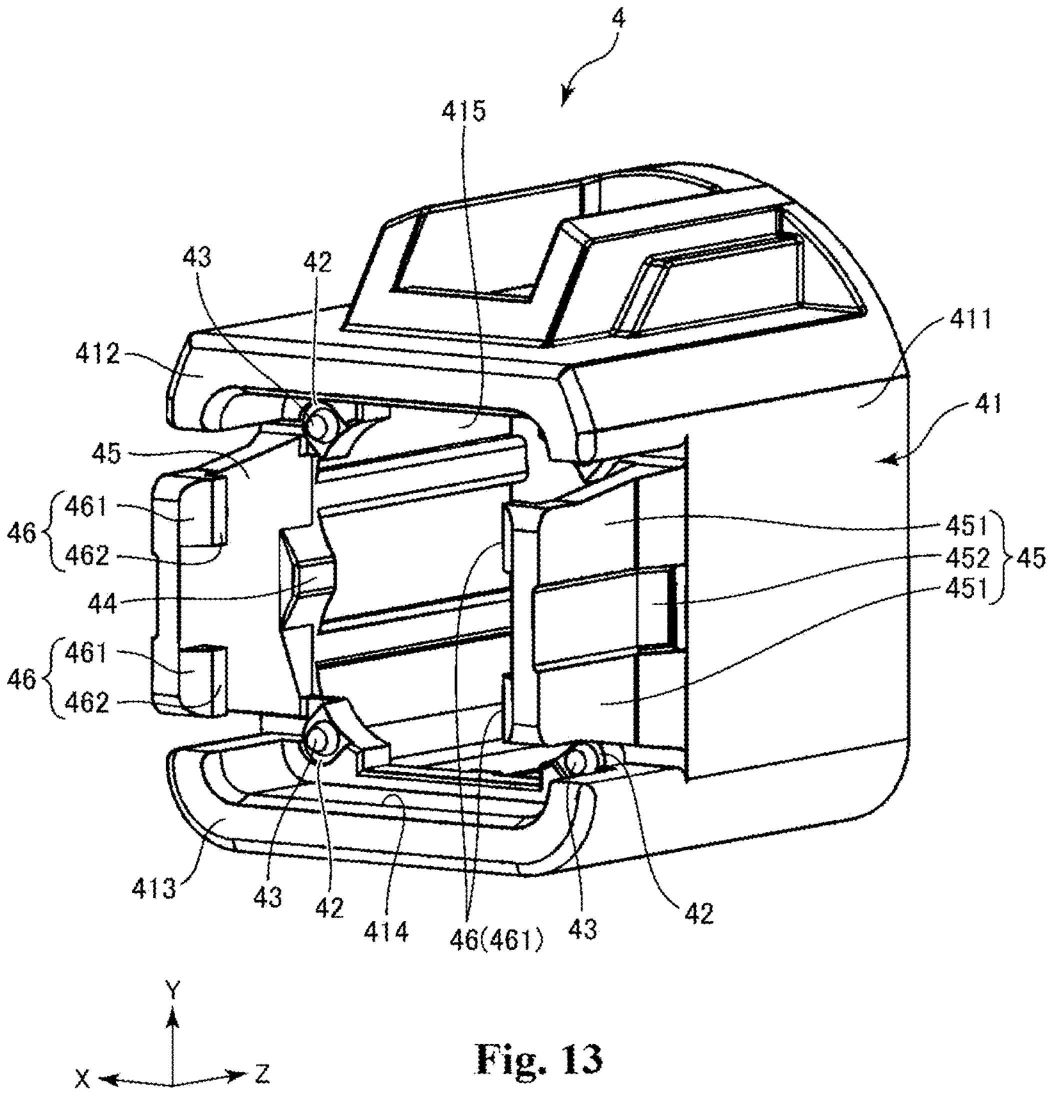
FIG. 13 is a perspective view showing the cover shown in FIG. 7 from another angle.
Figure 14:
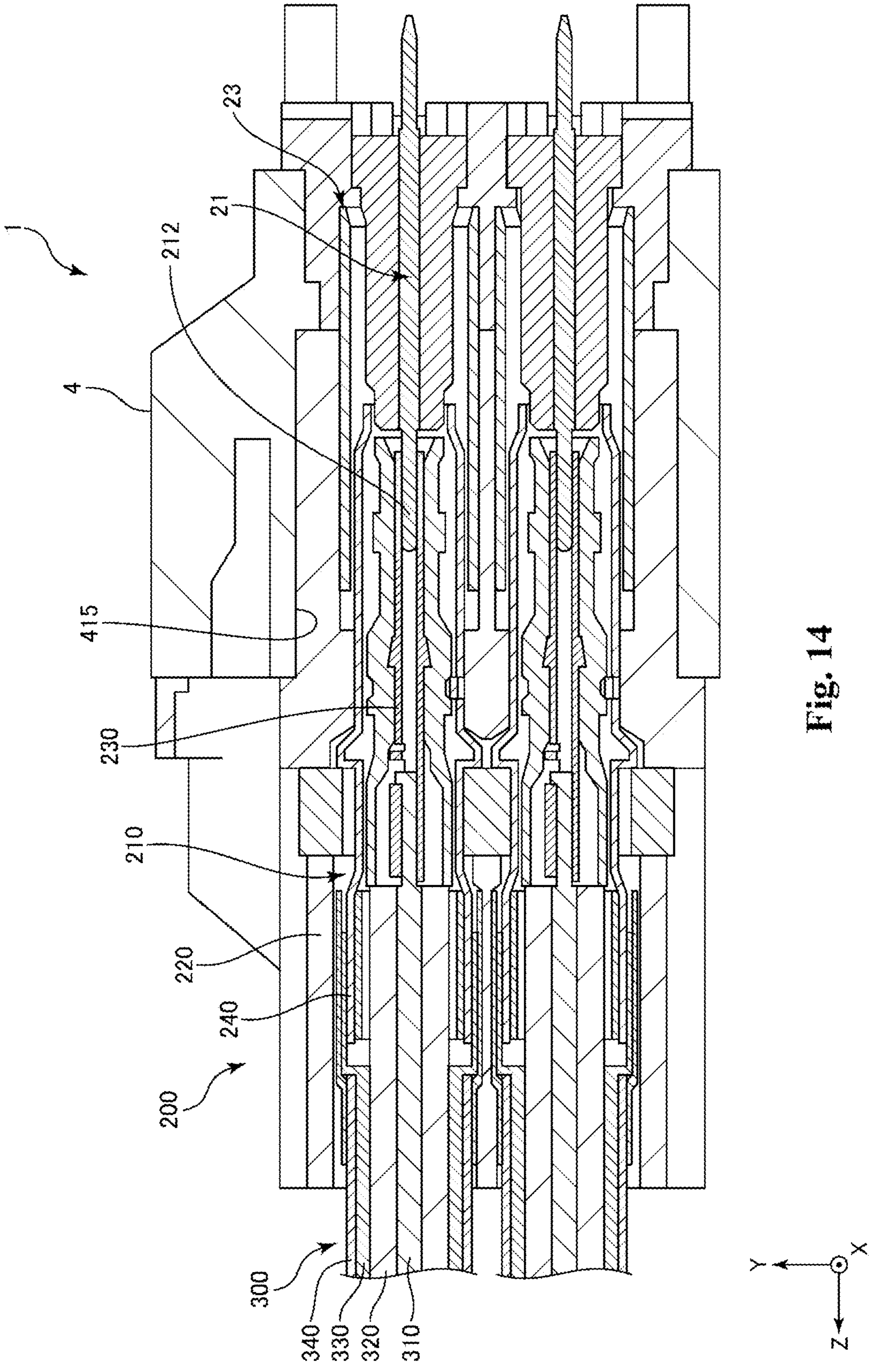
FIG. 14 is a cross-sectional view along a YZ plane including the contact pin in a state that the electric connector and the mating connector are coupled with each other.

FIG. 3 is a perspective view showing an electrical connector of the present disclosure, a circuit board on which the electrical connector of the present disclosure should be mounted, and a mating connector to be coupled with the electrical connector of the present disclosure. FIG. 4 is a perspective view of the electrical connector shown in FIG. 3. FIG. 5 is a perspective view showing the electrical connector shown in FIG. 3 from another angle. FIG. 6A is a cross-sectional view along a YZ plane including a contact pin of the electric connector. FIG. 6B is a cross-sectional view along an XZ plane including the contact pin of the electric connector. FIG. 7 is an exploded perspective view of the electrical connector shown in FIG. 3. FIG. 8 is an exploded perspective view of a receptacle assembly shown in FIG. 7. FIG. 9 is a perspective view showing a housing shown in FIG. 8 from another angle. FIG. 10 is a perspective view of a shell shown in FIG. 7. FIG. 11 is a perspective view showing the shell shown in FIG. 7 from another angle. FIG. 12 is a perspective view of a cover shown in FIG. 7. FIG. 13 is a perspective view showing the cover shown in FIG. 7 from another angle. FIG. 14 is a cross-sectional view along a YZ plane including the contact pin in a state that the electric connector and the mating connector are coupled with each other.

As shown in FIG. 3, an electrical connector 1 of the present disclosure is a receptacle connector which should be mounted on a circuit board 100 provided in an arbitrary device. When a mating connector (plug connector) 200 attached to one end portions of four coaxial cables 300 is inserted into the electrical connector 1 from the tip side to couple the electrical connector 1 with the mating connector 200, coaxial connections between the four coaxial cables 300 and the circuit board 100 are provided through the electrical connector 1 and the mating connector 200.

Each of the coaxial cables 300 has a coaxial structure in which a core wire (a center conductor) 310, an inner insulator layer 320 covering the core wire 310, an outer conductor layer (a braided layer) 330 covering the inner insulator layer 320, and an outer insulator layer 340 covering the outer conductor layer 330 are concentrically arranged. Although this matter is omitted in FIG. 3, other end portions of the coaxial cables 300 are connected to a device which is different from the device including the circuit board 100. Thus, when the electrical connector 1 and the mating connector 200 are coupled with each other, it becomes possible to perform a signal communication between the device including the circuit board 100 and the other device through the coaxial cables 300. The device including the circuit board 100 is typically an ECU (Electronic Control Unit) for controlling operations of a vehicle. The other device to which the other end portions of the coaxial cables 300 are connected is typically an in-vehicle device such as a car navigation, a car audio, an in-vehicle camera, an in-vehicle GPS, an in-vehicle TV and an in-vehicle radio. By coupling the electrical connector 1 and the mating connector 200 with each other, it becomes possible to perform a high-speed signal communication between the in-vehicle device and the ECU through the four coaxial cables 300. The electrical connector 1 may be a 1-pin connector for providing a coaxial connection with one coaxial cable 300 or may be a multi-pin connector for providing coaxial connections with a plurality of coaxial cables 300. Hereinafter, the electrical connector 1 will be described with assuming that the electrical connector 1 is a 4-pin connector for providing coaxial connections with the four coaxial cables 300.

As shown in FIGS. 4-7, in particular FIG. 7, the electrical connector 1 includes four receptacle assemblies 2 which should be respectively connected with four plug assemblies 210 (see FIG. 14) of the mating connector 200, a metallic shell 3 for holding the four receptacle assemblies 2, and a cover 4 attached to a tip side portion of the shell 3 to guide coupling between the electrical connector 1 and the mating connector 200.

The four receptacle assemblies 2 are members respectively connected to the plug assemblies 210 of the mating connector 200 to provide the coaxial connections between the four coaxial cables 600 and the circuit board 100. As shown in FIG. 8, each of the four receptacle assemblies 2 includes a contact pin 21 which should contact with a contact pin 230 (see FIG. 14) of the corresponding plug assembly 210 of the mating connector 200, an insulating housing 22 for holding the contact pin 21, and a cylindrical outer contact 23 for covering the housing 22.

The contact pin 21 is a rod-shaped member made of conductive material such as a copper alloy. The contact pin 21 has a function of contacting with the contact pin 230 of the corresponding plug assembly 210 of the mating connector 200 when the electrical connector 1 and the mating connector 200 are coupled with each other to provide an electrical connection between the mating connector 200 and the electrical connector 1. As shown in FIG. 8, the contact pin 21 includes a horizontally extending portion 211 linearly extending in the insertion and extraction direction of the mating connector 200 (the Z direction), a contact portion 212 linearly extending from a tip end portion of the horizontally extending portion 211 toward the tip side, a terminal portion 213 linearly extending from a base end portion of the horizontally extending portion 211 toward the base side, and a pair of press-fitting shoulders 214 respectively extending from both side portions (both side surfaces in the X direction) of the base end portion of the horizontally extending portion 211 in the width direction (the X direction or the outer side) of the contact pin 21 perpendicular to the insertion and extraction direction of the mating connector 200 (the Z direction).

The horizontally extending portion 211 is a plate-like portion linearly extending in the insertion and extraction direction of the mating connector 200 (the Z direction). When the contact pin 21 is press-fitted into an insertion hole 222 formed in a cylindrical portion 221 of the housing 22, the horizontally extending portion 211 is located in the cylindrical portion 221. In particular, as shown in the FIGS. 6A and 6B, the horizontally extending portion 211 is held in the insertion hole 222 of the housing 22, and thereby the contact pin 21 is held by the housing 22.

Referring back to FIG. 8, the contact portion 212 is a cylindrical portion linearly extending from the tip end portion of the horizontally extending portion 211 toward the tip side. In a state that the contact pin 21 is held by the housing 22, the contact portion 212 protrudes from the cylindrical portion 221 of the housing 22 toward the tip side and is exposed toward the outside. When the electrical connector 1 and the mating connector 200 are coupled with each other, the contact portion 212 contacts with the corresponding contact pin 230 of the mating connector 200 to provide the electrical connection between the mating connector 200 and the electrical connector 1.

The terminal portion 213 is a conical portion formed so as to protrude from the base end portion of the horizontally extending portion 211 toward base side. In the state that the contact pin 21 is held by the housing 22, the terminal portion 213 extends from the cylindrical portion 221 of the housing 22 toward the base side and is exposed toward the outside. The terminal portion 213 is connected to a corresponding terminal 120 (see FIG. 3) of the circuit board 100.

The pair of press-fitting shoulders 214 are plate-like portions respectively extending from the both side portions (the both side surfaces in the X direction) of the base end portion of the horizontally extending portion 211 in the width direction of the contact pin 21 (the X direction). A thickness (a length in the Y direction) of each of the press-fitting shoulders 214 is the same as a thickness of the horizontally extending portion 211. Thus, an upper surface of the horizontally extending portion 211 and upper surfaces of the pair of press-fitting shoulders 214 are located on one plane. Similarly, a lower surface of the horizontally extending portion 211 and lower surfaces of the pair of press-fitting shoulders 214 are also located on another one plane.

Each of the press-fitting shoulders 214 has a tapered shape whose width (a length in the X direction) gradually decreases from the base side (the −Z direction side) toward the tip side (the +Z direction side). Further, each of base end surfaces (−Z direction end surfaces) of the press-fitting shoulders 26 is a flat surface perpendicular to the insertion and extraction direction of the mating connector 200 (the Z direction). Further, each of inclined tip end surfaces (+Z direction end surfaces) of the press-fitting shoulders 214 is an inclined surface obliquely extending toward the outer side from the tip side toward the base side.

The contact pin 21 is press-fitted into the insertion hole 222 of the housing 22 by pressing the base end surfaces of the press-fitting shoulders 214 with a press-fitting tool having a pair of protrusions spaced apart from each other (for example, such a press-fitting device is disclosed in JP 2022-149019A). In this manner, the contact pin 21 is press-fitted into the insertion hole 222.

As shown in FIGS. 6A and 6B, when the contact pin 21 is inserted into the insertion hole 222 of the housing 22, the horizontally extending portion 211 is located in the insertion hole 222. Further, the contact portion 212 protrudes from the insertion hole 222 toward the tip side and is exposed in the outer contact 23. The terminal portion 213 protrudes from the insertion hole 222 toward the base side and is exposed toward the outside. The pair of press-fitting shoulders 214 are contained in a after-mentioned recess 224 of the housing 22.

The housing 22 is made of elastic insulating material such as resin material. As shown in FIGS. 8 and 9, the housing 22 includes the cylindrical portion 221 extending in the inserting and extracting direction of the mating connector 200, the insertion hole 222 passing through the cylindrical portion 221 in the inserting and extracting direction of the mating connector 200, four ribs 223 formed on an outer peripheral surface of the cylindrical portion 221 at regular angular intervals, the recess 224 formed on a base end surface of the cylindrical portion 221 so as to be opened toward the base side, a pair of D-cut planes 225 respectively formed on an upper portion and a lower portion of the outer peripheral surface of the cylindrical portion 221 so as to face each other, two backlash-filling ribs 226 formed on a base end portion of each of the D-cut planes 225 so as to protrude toward the outer side, and a pair of abutting surfaces 227 respectively located on the base side of the D-cut planes 225.

The cylindrical portion 221 linearly extends in the insertion and extraction direction of the mating connector 200. A length of the cylindrical portion 221 in the Z direction is substantially the same as a length of the horizontally extending portion 211 of the contact pin 21 in the Z direction. The cylindrical portion 221 includes a small-diameter portion 221*a* located on the tip side and a large-diameter portion 221*b* located on the base side. The small-diameter portion 221*a* and the large-diameter portion 221*b* are cylindrical portions integrally formed so as to be concentric with each other. The small-diameter portion 221*a* protrudes from a tip end surface of the large-diameter portion 221*b* toward the tip side. An outer diameter of the small-diameter portion 221*a* is smaller than an outer diameter of the large-diameter portion 221*b*.

The insertion hole 222 is located at a center of the small-diameter portion 221*a* and the large-diameter portion 221*b* of the cylindrical portion 221 and passes through the small-diameter portion 221*a* and the large-diameter portion 221*b* in the insertion and extraction direction of the mating connector 200. As described above, the contact pin 21 is press-fitted into the insertion hole 222. The four ribs 223 are protruding portions formed on an outer peripheral surface of the large-diameter portion 221*b* at the regular angular intervals so as to linearly extend in the insertion and extraction direction of the mating connector 200. When the housing 22 is press-fitted into the outer contact 23, the four ribs 223 are elastically deformed and contact with an inner peripheral surface of the outer contact 23. With this structure, it is possible to ensure a coaxiality between the housing 22 and the outer contact 23 and prevent the housing 22 from being removed from the outer contact 23. Although the four ribs 223 are formed on the outer peripheral surface of the large-diameter portion 221*b* at the regular angular intervals in the illustrated aspect, the number of ribs 223 formed on the outer peripheral surface of the large-diameter portion 221*b* at regular angular intervals is not limited thereto. Three, five or more ribs 223 may be formed on the outer peripheral surface of the large-diameter portion 221*b* at regular angular intervals.

The recess 224 has a function of containing the pair of press-fitting shoulders 214 of the contact pin 21 therein in the state that the contact pin 21 is held by the housing 22. The recess 224 is formed on a base end surface of the large-diameter portion 221*b* so as to be opened toward the base side. Further, the recess 224 communicates with the insertion hole 222. As shown in FIGS. 5 and 6B, in the state that the pin 21 is press-fitted into the insertion hole 222, the pair of press-fitting shoulders 214 are contained in the recess 224. Further, a base end surface (an end surface in the −Z direction) of the recess 224 is an inclined surface that is inclined so as to correspond to an inclination of tip end surfaces (end surfaces in the +Z direction) of the press-fit shoulders 214 as shown in FIG. 6B. Thus, when the contact pin 21 is held by the housing 22, a part of the tip end surface of each of the press-fitting shoulders 214 closely contacts with the base end surface of the recess 224. As a result, there is no gap or there is a very small gap between the base end surface of the recess 224 and the tip end surfaces of the press-fit shoulders 214.

Referring back to FIGS. 8 and 9, the pair of D-cut planes 225 have a function of preventing the receptacle assembly 2 from being rotated with respect to the shell 3 around the Z axis in a state that the receptacle assembly 2 is held by the shell 3. The pair of D-cut planes 225 are flat surfaces formed on the outer peripheral surface of the large-diameter portion 221*b* of the cylindrical portion 221 so as to face each other. In the illustrated embodiment, the pair of D-cut planes 225 are opposed flat surfaces perpendicular to the Y direction, which can be obtained by cutting tip side portions of the upper portion and the lower portion of the outer peripheral surface of the large-diameter portion 221*b* along the XZ plane. As described later, the shell 3 includes insertion holes 32 (see FIGS. 10 and 11) for respectively passing the receptacle assemblies 2 therethrough, and abutting portions 33 formed so as to respectively extend from inner surfaces of the insertion holes 32 toward the inner side. A shape of an opening defined by an inner surface of the abutting portion 33 corresponds to an outer shape of the tip side portion (a portion where the pair of D-cut planes 225 are formed) of the large-diameter portion 221*b*. Thus, in a state that the receptacle assembly 2 is passed through the insertion hole 32 and the receptacle assembly 2 is held by the shell 3, the pair of D-cut planes 225 abut against the inner surface of the abutting portion 33, and thereby it is possible to prevent the receptacle assembly 2 from being rotated with respect to the shell 3 around the Z axis.

Referring back to FIG. 9, the two backlash-filling ribs 226 have a function of filling gaps between the pair of D-cut planes 225 and the inner surface of the abutting portion 33 in the state that the receptacle assembly 2 is held by the shell 3 to prevent backlash of the receptacle assembly 2 in the insertion hole 32 of the shell 3. The two backlash-filling ribs 226 are formed on each of the D-cut planes 225 so as to protrude toward the outer side. Each of the two backlash-filling ribs 226 is a portion linearly extending on the D-cut plane 225 in the insertion and extraction direction of the mating connector 200. Each of the two backlash-filling ribs 226 has an inclined portion 226*a* whose height gradually increases from the tip side toward the base side, and a flat portion 226*b* which is located on the base side of the inclined portion 226*a* and whose height is constant.

The inclined portion 226*a* is formed on the D-cut plane 225 so that an upper surface of a tip end portion thereof is continuous with the D-cut plane 225 and an upper surface of a base end portion is continuous with an upper surface of the flat portion 226*b*. When the housing 22 is passed through the insertion hole 32 of the shell 3, the inner surface of the abutting portion 33 of the shell 3 slides on the upper surface of the inclined portion 226*a*, and thereby the insertion of the housing 22 into the insertion hole 32 is guided. The flat portion 226*b* is located at the base side of the inclined portion 226*a* on the D-cut plane 225 and formed integrally with the inclined portion 226*a*. A tip end portion of the flat portion 226*b* is integrated with the inclined portion 226*a*, and a base end portion of the flat portion 226*b* is integrated with the abutting surface 227. As shown in FIG. 6A, in the state that the housing 22 is passed through the insertion hole 32 and the receptacle assembly 2 is held by the shell 3, each of the flat portions 226*b* is compressed between the D-cut plane 225 and the inner surface of the abutting portion 33 of the shell 3. With this configuration, the gaps between the pair of D-cut planes 225 and the inner surface of the abutting portion 33 are filled in the state that the receptacle assembly 2 is held by the shell 3, and thereby it is possible to prevent the backlash of the receptacle assembly 2 in the insertion hole 32 of the shell 3. In this regard, although the two backlash-filling ribs 226 are provided on each of D-cut planes 225 in the illustrated aspect, the number of backlash-filling ribs 226 is not limited thereto. One, three or more backlash-filling ribs 226 may be provided on each of the D-cut planes 225.

The pair of abutting surfaces 227 have a function of restricting the insertion of the housing 22 into the insertion hole 32 of the shell 3 in the tip side (the +Z direction). The pair of abutting surfaces 227 are respectively formed on the outer peripheral surface of the large-diameter portion 221*b* of the cylindrical portion 221 on the base side of the pair of D-cut planes 225. Each of the abutting surfaces 227 is a flat surface perpendicular to the insertion and extraction direction of the mating connector 200. As shown in FIG. 6A, when the housing 22 is inserted into the insertion hole 32 of the shell 3 from the base side, the pair of abutting surfaces 227 abut against a base end surface of the abutting portion 33 formed on the inner surface of the insertion hole 32, and thereby the insertion of the housing 22 into the insertion hole 32 is restricted. With this configuration, it is possible to perform positioning of the housing 22 in the Z direction with respect to the shell 3.

As described above, in the electrical connector 1 of the present disclosure, the rotation of the housing 22 with respect to the shell 3 is prevented by the engagement between the pair of D-cut planes 225 and the inner surface of the abutting portion 33 of the shell 3, and the positioning of the housing 22 in the Z direction with respect to the shell 3 is accurately performed by the abutment between the pair of abutting surfaces 227 and the base end surface of the abutting portion 33. Therefore, it is possible to effectively prevent buckling of the housing 22 (the receptacle assembly 2) in the insertion hole 32 of the shell 3.

Further, since the positioning of the housing 22 in the Z direction with respect to the shell 3 can be accurately performed, it is possible to significantly suppress assembly allowable assembly errors when the housing 22 (the receptacle assembly 2) is attached to the shell 3. Further, since the insertion of the housing 22 into the insertion hole 32 is restricted by the abutment between the pair of abutting surfaces 227 of the housing 22 and the base end surface of the abutting portion 33 of the shell 3, it is possible to prevent the housing 22 from moving toward the tip side even when the housing 22 is pulled toward the tip side in the state that the electrical connector 1 is assembled. Therefore, it is possible to prevent an assembly position shift of the housing 22 (the receptacle assembly 2) after the electrical connector 1 is assembled. Further, in the electrical connector 1 of the present disclosure, since the rotation of the housing 22 with respect to the shell 3 is prevented, and the positioning of the housing 22 with respect to the shell 3 is accurately performed, it is possible to reliably keep a separation distance, which is between the contact pin 21 press-fitted into the housing 22 and the shell 3 functioning as a ground, constant. As a result, it is possible to stabilize high-frequency signal transmission characteristics of the electrical connector 1.

Referring back to FIG. 8, the outer contact 23 is a cylindrical member made of metallic material. The outer contact 23 includes a cylindrical body portion 231, four ribs 232 protruding from an outer peripheral surface of the body portion 231 toward the outer side, and a pair of positioning protrusions 233 protruding from the outer peripheral surface of the body portion 231 toward the outer side.

The body portion 231 is a cylindrical portion linearly extending in the insertion and extraction direction of the mating connector 200. The four ribs 232 are formed in order to prevent the outer contact 23 from being removed from the insertion hole 32 of the shell 3 by its own weight and secure a coaxiality between the outer contact 23 and the insertion hole 32. The four ribs 232 are formed on an outer peripheral surface of a base side portion of the body portion 231 at regular angular intervals and linearly extend in the insertion and extraction direction of the mating connector 200. When the outer contact 23 is press-fitted into the insertion hole 32, the four ribs 232 abut against an inner surface of the insertion hole 32. Since the four ribs 232 abut against the inner surface of the insertion hole 32 as described above, the outer contact 23 is fixed in the insertion hole 32. As a result, it is possible to prevent the outer contact 23 from being removed from the insertion hole 32 by its own weight. Further, since the four ribs 232 abut against the inner surface of the insertion hole 32, it is possible to ensure the coaxiality between the outer contact 23 and the insertion hole 32. Although the four ribs 232 are formed on the outer peripheral surface of the base side portion of the body portion 231 at the regular angular intervals in the illustrated aspect, the number of ribs 232 formed on the outer peripheral surface of the base side portion of the body portion 231 at regular angular intervals is not limited thereto. Three, five or more ribs 232 may be formed on the outer peripheral surface of the base side portion of the body portion 231 at regular angular intervals.

The pair of positioning protrusions 233 are provided to restrict an attachment angle of the outer contact 23 with respect to the shell 3. Each of the positioning protrusions 233 is a plate-like portion formed so as to linearly extend from the outer peripheral surface of the body portion 231 toward the outer side. The pair of positioning protrusions 233 face each other through a gap therebetween. Each of the positioning protrusions 233 has a base end portion integrated with the outer peripheral surface of the body portion 231 and linearly extends in a radial direction of the body portion 231. A height of each of the positioning protrusions 233 is higher than a height of each of the four ribs 232 formed on the outer peripheral surface of the body portion 231. The outer contact 23 is press-fitted into the insertion hole 32 of the shell 3 with a posture in which the pair of positioning protrusions 233 are inserted into a positioning recess 39 (see FIG. 10) of the shell 3 described later. Thus, it is possible to restrict the attachment angle of the outer contact 23 with respect to the shell 3.

Referring back to FIG. 7, the shell 3 has a function as a housing for containing the components of the electrical connector 1 therein and a function as an electrical path for electrically connecting between the four outer contacts 23 and the ground terminals 110 on the circuit board 100. As shown in FIGS. 10 and 11, the shell 3 is a rectangular parallelepiped member made of metallic material. The shell 3 includes a plate-like body portion 31, the four insertion holes 32 passing through the body portion 31 in the Z direction, the abutting portions 33 respectively formed on the inner surfaces of the four insertions holes 32 so as to extend toward the inner side, a pair of relief portions 34 respectively formed on both X-direction side surfaces of the body portion 31, a pair of ground terminal bases 35 respectively formed on an upper portion (+Y direction side portion) and a lower portion (−Y direction side portion) of the body portion 31 so as to extend toward the outer side, four ground terminals 36 extending from base end surfaces of the pair of ground terminal bases 35 toward the base side, a pair of wall portions 37 formed on each of both X-direction side surfaces of the body portion 31 so as to be spaced apart from each other and extend in the Z direction, cover receiving portions 38 each defined by inner surfaces of the wall portions 37 and the X-direction side surface of the body portion 31, and the four positioning recesses 39 for receiving the pair of positioning protrusions 233 of the outer contact 23.

The body portion 31 is a plate-like portion having a rectangular planar shape whose corner portions are R-processed when the body portion 31 is viewed from the Z direction. The four insertion holes 32 are circular holes formed in the body portion 31 through which the four receptacle assemblies 2 are respectively passed. The four insertion holes 32 are formed on the body portion 31 so as to be spaced apart from each other at equal intervals with forming a 2×2 matrix and pass through the body portion 31 in the Z direction. A diameter of the insertion hole 32 is substantially equal to an outer diameter of the body portion 231 of the outer contact 23. Thus, it is possible to attach the outer contact 23 to the shell 3 by press-fitting the outer contact 23 into the insertion hole 32 from the tip side.

Each of the four abutting portions 33 is provided to prevent the rotation of the housing 22 (the receptacle assembly 2) in the insertion hole 32 and perform the positioning of the housing 22 in the Z direction with respect to the shell 3. The abutting portion 33 is formed so as to extend from a base side portion of the inner surface of the insertion hole 32 toward the inner side. Further, the tip end surface and the base end surface of the abutting portion 33 are flat surfaces perpendicular to the Z direction. The abutting portion 33 is configured so that a shape of an opening defined by an inner surface of the abutting portion 33 corresponds to the outer shape of the above-described tip side portion (the portion where the pair of D-cut planes 225 are formed) of the housing 22. With this configuration, the rotation of the housing 22 with respect to the shell 3 is prevented by the above-described engagement between the pair of D-cut planes 225 and the inner surface of the abutting portion 33 of the shell 3, and the positioning of the housing 22 in the Z direction with respect to the shell 3 is accurately performed by the abutment between the pair of abutting planes 227 and the base end surface of the abutting portion 33.

The pair of relief portions 34 are provided to perform positioning of the cover 4 with respect to the shell 3. The pair of relief portions 34 are respectively formed on tip side portions of both X-direction side surfaces of the body portion 31. The pair of relief portions 34 are respectively formed at positions and shapes corresponding to a pair of positioning protrusions 44 of the cover 4 described later. By respectively inserting the pair of positioning protrusions 44 into the pair of relief portions 34, it is possible to perform the positioning of the cover 4 with respect to the shell 3.

The pair of ground terminal bases 35 are respectively formed on an upper side (+Y direction side) edge portion and a lower side (−Y direction side) edge portion of the body portion 31 so as to extend toward the base side. Further, each of the ground terminal bases 35 protrudes toward the outer side (the Y direction side) from the body portion 31 in the planar view from the Z direction. The two ground terminals 36 are formed on a base end surface of one of the ground terminal bases 35 so as to extend toward the base side and the remaining two ground terminals 36 are formed on a base end surface of the other of the ground terminal bases 35 so as to extend toward the base side. By providing the four ground terminals 36 on the pair of ground terminal bases 35, it is possible to improve a twist strength (strength against load around the Z axis) at root portions of the four ground terminals 36.

The four ground terminals 36 are respectively connected to the corresponding ground terminals 110 (see FIG. 3) of the circuit board 100. Since the four ribs 232 of the outer contact 23 abut against the inner surface of the insertion hole 32 of the shell 3 by the press-fitting as described above, the shell 3 and the outer contact 23 are electrically connected to each other. Further, since the shell 3 is electrically connected to the ground terminals 110 through the ground terminals 36, electrical potential of the outer contact 23 electrically connected to the shell 3 becomes equal to the ground potential.

The pair of wall portions 37 are provided to respectively form the pair of cover receiving portions 38 on both X-direction side surfaces of the body portion 31 for receiving the pair of protruding pieces 45 of the cover 4. Each of the wall portions 37 includes an inclined portion 371 which extends from an edge portion of a tip end surface of the body portion 31 toward base side and whose width (a length in the Y direction) gradually increases from the tip side toward the base side, and a straight portion 372 which linearly extends from a base end portion of the inclined portion 371 toward base side and whose width (a length in the Y direction) is constant. A tip end surface of the inclined portion 371 is a flat surface which is continuous with the tip end surface of the body portion 31 and perpendicular to the Z direction. An outer surface (an outer surface in the Y direction) of the inclined portion 371 is a flat surface perpendicular to the Y direction. An inner surface (an inner surface in the Y direction) of the inclined portion 371 is a flat inclined surface inclined from the outer side toward the inner side.

The straight portion 372 linearly extends from the base end portion of the inclined portion 371 toward the base side and is integrated with the ground terminal base 35. Further, an X-direction side surface of the straight portion 372 is a flat surface which is continuous with an X-direction side surface of the ground terminal base 35.

The pair of cover receiving portions 38 are respectively formed on both X-direction side surfaces of the body portion 31 and have a function of respectively receiving the pair of protruding pieces 45 of the cover 4. The cover receiving portion 38 is defined by the X-direction side surface of the body portion 31 and the inner surfaces (the inner surfaces in the Y direction) of the wall portions 37. Since the inner surface of the inclined portion 371 of the wall portion 37 is the flat inclined surface inclined from the outer side toward the inner side as described above, a Y-direction opening width of the cover receiving portion 38 at a portion where the inclined portions 371 are formed gradually decreases from the tip side toward the base side. On the other hand, at a portion where the straight portions 372 are formed, the Y-direction opening width of the cover receiving portion 38 is constant. With this configuration, it is possible to guide attachment of the cover 4 to the shell 3.

Further, as shown in FIG. 11, each of the cover receiving portions 38 includes a thick portion 381 located on the tip side (the +Z direction side) and an engagement recess 382 located on the base side (the −Z direction side) of the thick portion 381. The thick portion 381 is a tip side portion of the X-direction side surface of the body portion 31 and is a flat surface perpendicular to the X direction. The engagement recess 382 is a recess formed by cutting out a base side portion of the X-direction side surface of the body portion 31. In the illustrated aspect, a shape of the engagement recess 382 is a rectangular shape which extends over an entire area of the cover receiving portion 38 in the height direction (the Y direction). The shape and a depth of the engagement recess 382 are appropriately set in accordance with a shape of the engagement protrusion 46 of the cover 4 described later. Further, a thickness (a length in the X direction) of the engagement recess 382 is smaller than a thickness of the thick portion 381.

A tip end surface 383 of the engagement recess 382 is a flat surface perpendicular to the Z direction and connects between an X-direction side surface of the thick portion 381 and a bottom surface (an X-direction side surface) of the engagement recess 382. When a tip side portion of the shell 3 is inserted into a base side opening 414 of the cover 4 to attach the cover 4 to the shell 3, the pair of engagement protrusions 46 of the cover 4 engage with the tip end surface 383 by a snap fit as described later. With this configuration, the cover 4 is attached to the tip end portion of the shell 3 and the cover 4 is locked with respect to the shell 3.

As particularly clearly shown in FIG. 6B, the pair of engagement protrusions 46 of the cover 4 are respectively contained in the engagement recesses 382 of the pair of cover receiving portions 38 of the shell 3 by the snap fit. Thus, even if external force in the +Z direction is applied to the cover 4, the cover 4 is prevented from being removed from the shell 3 because the engagement protrusions 46 are engaged with the tip end surfaces 383 of the engagement recesses 382.

Referring back to FIG. 10, the positioning recess 39 is formed to receive the pair of positioning protrusions 233 of the outer contact 23. The positioning recess 39 is formed on the tip end surface of the body portion 31 so as to communicate with the insertion hole 32 and extend in the radial direction of the insertion hole 32. The outer contact 23 is press-fitted into the insertion hole 32 in a posture in which the pair of positioning protrusions 233 are positioned in the positioning recess 39. With this configuration, the outer contact 23 can be positioned with respect to the shell 3. In the state that the outer contact 23 is press-fitted into the insertion hole 32, the base end surfaces of the pair of positioning protrusions 233 are inserted into the positioning recess 39. Further, a depth (a length in the Z direction) of the positioning recess 39 is adjusted so that tip end portions of the pair of positioning protrusions 233 of the outer contact 23 are exposed to the tip side from the positioning recess 39 in the state that the outer contact 23 is press-fitted into the insertion hole 32. Thus, when the cover 4 is attached to the shell 3, the pair of positioning protrusions 233 are sandwiched between the shell 3 and the cover 4.

Referring back to FIG. 7, the cover 4 is attached to the tip side portion of the shell 3 and has a function of guiding the coupling between the electrical connector 1 and the mating connector 200. As shown in FIGS. 12 and 13, the cover 4 includes a rectangular cylindrical body portion 41, four press-fitting recesses 42 formed on a base end surface of the body portion 41, four protrusions 43 respectively formed in the four press-fitting recesses 42, a pair of positioning protrusions 44 formed on an inner surface of the body portion 41, the pair of protruding pieces 45 extending from the body portion 41 toward the base side, and the pair of engagement protrusions 46 extending from a tip side edge portion of an inner surface of each of the protruding pieces 45 toward the inner side.

The body portion 41 has a cylindrical portion 411, an upper receiving portion 412 extending from an upper portion of the cylindrical portion 411 toward the base side, a lower receiving portion 413 extending from a lower portion of the cylindrical portion 411 toward the base side, a base side opening 414 defined by inner surfaces of the upper receiving portion 412 and the lower receiving portion, and the tip side opening 415 defined by an inner surface of a tip side portion of the cylindrical portion 411. The cover 4 is attached to the tip side portion of the shell 3 by inserting the tip side portion of the shell 3 into the base side opening 414. Further, in the state in which the electrical connector 1 is assembled, the mating connector 200 is inserted into the tip side opening 415 to guide the coupling between the electrical connector 1 and the mating connector 200.

The upper receiving portion 412 is a portion extending from the upper portion of the base end surface of the cylindrical portion 411 toward the base side. The inner surface of the upper receiving portion 412 has a shape corresponding to an upper portion of the tip side portion of the body portion 31 of the shell 3. The lower receiving portion 413 is a portion extending from the lower portion of the base end surface of the cylindrical portion 411 toward the base side. The inner surface of the lower receiving portion 413 has a shape corresponding to a lower portion of the tip side portion of the body portion 31. With this configuration, when the cover 4 is attached to the shell 3, the inner surfaces of the upper receiving portion 412 and the lower receiving portion 413 are fitted to the tip side portion of the body portion 31, and thereby the shell 3 is supported from the upper and lower directions by the upper receiving portion 412 and the lower receiving portion 413.

The base side opening 414 is defined by the inner surfaces of the upper receiving portion 412 and the lower receiving portion 413. The tip side opening 415 has an inner shape corresponding to an outer shape of the cover 220 of the mating connector 200. When the mating connector 200 is inserted into the tip side opening 415, an outer surface of the cover 220 engages with an inner surface of the tip side opening 415. When the mating connector 200 is slid into the body portion 41 in a state that the outer surface of the cover 220 is engaged with the inner surface of the tip side opening 415, the coupling between the electrical connector 1 and the mating connector 200 is guided.

As shown in FIG. 13, the four press-fitting recesses 42 are formed on the base end surface of the body portion 41. Each of the four press-fitting recesses 42 is formed on the base end surface of the body portion 41 with a position and a shape corresponding to the above-described positioning recess 39 of the shell 3. When the cover 4 is attached to the shell 3, the four press-fitting recesses 42 respectively face the four positioning recesses 39. Each of the four protrusions 43 is formed in the corresponding press-fitting recess 42 so as to have a conical shape whose diameter gradually decreases from the tip side toward the base side. As described above, the pair of positioning protrusions 233 of the outer contact 23 are positioned in the positioning recess 39. Further, the tip end portions of the pair of positioning protrusions 233 protrude from the positioning recess 39 toward the tip side. Thus, when the cover 4 is attached to the shell 3, the protrusion 43 contacts with the tip end portions of the pair of positioning protrusions 233. Therefore, when the cover 4 is attached to the shell 3, the pair of positioning protrusions 233 are sandwiched between the cover 4 and the shell 3.

The pair of positioning protrusions 44 are formed to be respectively inserted into the pair of relief portions 34 formed on the body portion 31 of the shell 3 to perform the positioning of the cover 4 with respect to the shell 3. The pair of positioning protrusions 44 are formed so as to protrude from X-direction inner surfaces of the cylindrical portion 411 toward the inner side and extend on the inner surfaces of the pair of protruding pieces 45. Each of the positioning protrusions 44 has a shape corresponding to the relief portion 34. Thus, when the tip side portion of the shell 3 is inserted into the base side opening 414 of the cover 4, the pair of positioning protrusions 44 are respectively contained in the pair of relief portions 34, and thereby it is possible to perform the positioning of the cover 4 with respect to the shell 3.

The protruding pieces 45 are plate-like portions respectively extending from base end portions of a pair of X-direction opposed side surfaces (wall portions) of the body portion 41 toward the base side. The pair of protruding pieces 45 face each other through a gap therebetween. Each of the protruding pieces 45 has a shape corresponding to the corresponding cover receiving portion 38 of the shell 3 described above. When the cover 4 is attached to the shell 3, the pair of protruding pieces 45 are respectively contained in the pair of cover receiving portions 38.

Each of the protruding pieces 45 includes a pair of thick portions 451 extending from a base end portion of the X-direction side surface (wall portion) of the body portion 41 toward the base side with being spaced apart from each other, and a thin portion 452 located between the pair of thick portions 451 and extending from the base end portion of the X-direction side surface (wall portion) of the body portion 41 toward the base side.

As shown in FIG. 13, a tip end portion (a +Z direction side portion) of each of the thick portions 451 and the thin portion 452 continuously extends from the base end portion of the X-direction side surface of the body portion 41 toward the base side. Further, a thickness (a length in the X-direction) of the tip end portion gradually decreases from the tip side toward the base side. An inner surface of the tip end portion of the thick portion 451 is a flat surface perpendicular to the X direction. An outer surface of the tip end portion of the thick portion 451 is an inclined surface inclined toward the inner side from the tip side toward the base side. A base end portion of each of the thick portions 451 and the thin portion 452 linearly extends from the tapered tip end portion toward the base side. The base end portion has a constant height from the tip side toward the base side. Each of the thick portions 451 is located at both Y-direction end portions of the protruding piece 45 and is spaced apart from each other through the thin portion 452.

The thin portion 452 is located between the pair of thick portions 451 and connects between the pair of thick portions 451. The thin portion 452 is a portion formed at a Y-direction substantially central portion of the protruding piece 45 so as to extend toward the base side.

The thin portion 452 is formed by cutting out a Y-direction substantially central portion of an outer surface of the protruding piece 45. An outer surface of the thin portion 452 is located on the inner side of outer surfaces of the pair of thick portions 451. Thus, a thickness (a length in the X direction) of the thin portion 452 is thinner than a thicknesses of each of the thick portions 451. By forming the thin portion 452 on the protruding piece 45, it is possible to improve X-direction elasticity of the protruding piece 45. When the cover 4 is attached to the tip side portion of the shell 3, the pair of protruding pieces 45 contact with the cover receiving portions 38 of the shell 3, and thereby the pair of protruding pieces 45 are elastically deformed toward the outer side and opened as described later. In the electrical connector 1 of the present disclosure, since the X-direction elasticity of the protruding piece 45 is improved by forming the thin portion 452 on the protruding piece 45, it is possible to reduce insertion force required when attaching the cover 4 to the shell 3, that is, it is possible to reduce force required to elastically deform the pair of protruding pieces 45 toward the outer side.

As shown in FIG. 13, the pair of engagement protrusions 46 are tapered portions respectively protruding from the base end portions of the inner surfaces of the pair of the protruding pieces 45 toward the inner side. Although each of the engagement protrusions 46 contains two engagement protrusions 46 respectively protruding from an upper portion and a lower portion of the inner surface of the protruding piece 45 with being spaced apart from each other in the Y direction in the illustrated aspect, the number of engagement protrusions 46 formed at the base end portion of the inner surface of the protruding piece 45 is not limited thereto. One, three or more engagement protrusions 46 may be formed at the base end portion of the inner surface of the protruding piece 45 as long as the cover 4 can be attached to the tip side portion of the shell 3 by the snap fit and it is possible to prevent the cover 4 from being removed from the tip side portion of the shell 3.

The engagement protrusion 46 includes an inclined portion 461 located on the base side and a flat portion 462 linearly extending from a tip end portion of the inclined portion 461. The inclined portion 461 is a portion whose base end surface is continuous with a base end portion of the protruding piece 45 and whose height (a length in the X direction) gradually increases from the base side toward the tip side. An inner surface of the inclined portion 461 is an inclined surface inwardly inclined from the base side toward the tip side. When the cover 4 is attached to the shell 3, the cover receiving portion 38 of the shell 3 slides on the inner surface of the inclined portion 461, and thereby the protruding piece 45 is gradually elastically deformed and opened toward the outer side. The flat portion 462 is a portion which linearly extends from the tip end portion of the inclined portion 461 and whose height is constant from the base side toward the tip side. A tip end surface of the flat portion 462 is a flat surface perpendicular to the Z direction. The tip end surface of the flat portion 462 engages with the tip end surface 383 of the cover receiving portion 38 of the shell 3 by the snap fit, and thereby the cover 4 is attached to the tip side portion of the shell 3.

The electrical connector 1 including the above-described components can be assembled, for example, by the following procedure. First, the four contact pins 21 are respectively press-fitted into the four housings 22 with a press-fitting tool (for example, a press-fitting tool disclosed in JP 2022-149019A). Since the press-fitting of the four contact pins 21 into the four housings 22 is performed by the same steps, description will be given to the steps for press-fitting the one contact pin 21 into the one housing 22 as a representative example.

First, the contact portion 212 of the contact pin 21 is inserted into the insertion hole 222 of the housing 22. Next, a pair of protrusions of the press-fitting tool are brought into contact with the entire areas of the base end surfaces of the pair of press-fitting shoulders 214 of the contact pin 21. Next, the entire areas of the base end surfaces of the press-fitting shoulders 214 are respectively pressed by the pair of protrusions of the press-fitting tool to press-fit the contact pin 21 into the insertion hole 222. When the press-fitting shoulders 214 are contained in the recess 224 formed on the base end surface of the housing 22, the press-fitting of the contact pin 21 into the housing 22 is completed.

Next, the four outer contacts 23 are respectively press-fitted into the four insertion holes 32 of the shell 3 from the tip side to attach the four outer contacts 23 to the shell 3. Since the press-fitting of the four outer contacts 23 into the four insertion holes 32 is performed by the same steps, description will be given to the steps of press-fitting the one outer contact 23 into the one insertion hole 32 as a representative example. The outer contact 23 is press-fitted into the insertion hole 32 from the tip side in a posture in which the pair of positioning protrusions 233 of the outer contact 23 are located in the positioning recess 39 of the shell 3. Further, when the outer contact 23 is press-fitted into the insertion hole 32, the four ribs 232 of the outer contact 23 contact with the inner surface of the insertion hole 32. As a result, the outer contact 23 is fixed in the insertion hole 32.

Next, the four housings 22 in which the contact pins 21 are respectively press-fitted are press-fitted into the shell 3 from the base side. Since the press-fitting of the four housings 22 into the shell 3 is performed by the same steps, description will be given to the steps of press-fitting the one housing 22 into the shell 3 from the base side as a representative example. First, the cylindrical portion 221 of the housing 22 is passed through the opening defined by the inner surface of the abutting portion 33 from the base side. The inner surface of the abutting portion 33 extends from the inner surface of the insertion hole 32 toward the inner side. Since the opening defined by the inner surface of the abutting portion 33 has the shape corresponding to the outer shape of the large-diameter portion 221*b* of the cylindrical portion 221 and the pair of D-cut planes 225 are formed on the outer peripheral surface of the cylindrical portion 221 as described above, the housing 22 is inserted into the insertion hole 32 from the base side in a posture in which the pair of D-cut planes 225 are fitted with the opening defined by the inner surface of the abutting portion 33.

When the pair of abutting surfaces 227 of the housing 22 abut against the base end surface of the abutting portion 33 of the shell 3 to restrict the insertion of the housing 22 into the shell 3, the insertion of the housing 22 into the shell 3 is completed. Further, in this state, the pair of D-cut planes 225 engage with the inner surface of the abutting portion 33, and thereby it is possible to prevent the housing 22 from being rotated with respect to the shell 3. Further, the backlash-filling ribs 226 provided on each of the D-cut planes 225 are compressed between the D-cut plane 225 and the inner surface of the abutting portion 33. With this configuration, the gaps between the D-cut planes 225 and the inner surface of the abutting portion 33 are filled. Thus, it is possible to prevent the backlash of the housing 22 (the receptacle assembly 2) in the insertion hole 32 of the shell 3.

In the state that the press-fitting of the housing 22 into the shell 3 is completed, the four ribs 223 formed on the cylindrical portion 221 of the housing 22 contact with the inner peripheral surface of the outer contact 23 in a compressed state. Thus, the housing 22 is fixed in the outer contact 23.

Next, the cover 4 is attached to the shell 3 from the tip side. Specifically, the tip side portion of the shell 3 is press-fitted into the base side opening 414 of the cover 4 in a posture that the pair of protruding pieces 45 of the cover 4 are respectively inserted into the pair of cover receiving portions 38 of the shell 3. At this time, the cover receiving portions 38 respectively slide on the inclined surfaces of the inclined portions 461 of the pair of engagement protrusions 46 of the cover 4, and thereby the protruding pieces 45 are elastically deformed and opened toward the outer side as the shell 3 is inserted into the cover 4. When the insertion of the shell 3 into the cover 4 progresses and the flat portions 462 of the engagement protrusions 46 exceed the tip end surfaces 383 of the engagement recesses 382 of the cover receiving portions 38, the protruding pieces 45 are elastically restored toward the inner side. As a result, the tip end surfaces of the flat portions 462 of the engagement protrusions 46 are engaged with the tip end surfaces 383 of the cover receiving portions 38 of the shell 3 by the snap fit. Due to the engagement caused by the snap fit, the attachment of the cover 4 to the tip side portion of the shell 3 is completed. Although one example of the assembling procedure for the electrical connector 1 has been described in detail in the above description, the assembling procedure for the electrical connector 1 of the present disclosure is not limited thereto. The electrical connector 1 can be assembled by an arbitrary suitable assembling procedure.

FIG. 14 is a cross-sectional view of a YZ plane including the contact pin 21 in a state that the electric connector 1 and the mating connector 200 are coupled with each other. As shown in FIG. 14, when the mating connector 200 is inserted into the electrical connector 1 from the tip side and the cover 220 of the mating connector 200 is inserted into the tip side opening 415 of the cover 4 of the electrical connector 1, the electrical connector 1 and the mating connector 200 are coupled with each other. In this state, the contact portion 212 of the contact pin 21 of the electrical connector 1 contacts with the contact pin 230 of the corresponding plug assembly 210 of the mating connector 200. The contact pin 230 is connected to the core wire 310 of the corresponding coaxial cable 300. Thus, in the state in which the electrical connector 1 and the mating connector 200 are coupled with each other, the contact pin 21 of the electrical connector 1 is electrically connected to the core wire 310 of the coaxial cable 300 through the contact pin 230 of the mating connector 200.

Further, the outer contact 23 of the electrical connector 1 contacts with the outer contact 240 of the corresponding plug assembly 210 of the mating connector 200. The outer contact 240 is connected to the outer conductor layer 330 of the corresponding coaxial cable 300. Therefore, in the state that the electrical connector 1 and the mating connector 200 are coupled with each other, the outer contact 23 is electrically connected to the outer conductor layer 330 of the coaxial cable 300 through the corresponding outer contact 240 of the mating connector 200. With this configuration, the electrical connector 1 is coaxially connected to the four coaxial cables 300 through the mating connector 200.

As described above, the electrical connector 1 of the present disclosure is configured so that each of the protruding pieces 45 extending from the body portion 41 of the cover 4 toward the base side includes the pair of thick portions 451 and the thin portion 452 located between the pair of thick portions 451. By forming the thin portion 452 on the protruding piece 45, it is possible to improve the X-direction elasticity of the protruding piece 45. Thus, when the cover 4 is attached to the tip side portion of the shell 3, it is possible to elastically deform the pair of protruding pieces 45 toward the outer side easily. Therefore, it is possible to reduce the insertion force required when the cover 4 is attached to the shell 3, that is, it is possible to reduce the force required for elastically deforming the pair of protruding pieces 45 toward the outer side.

Further, since the attachment of the cover 4 with respect to the shell 3 is performed by the snap fit between the tip end surfaces of the flat portions 462 of the engagement protrusions 46 of the cover 4 and the tip end surfaces 383 of the cover receiving portions 38 of the shell 3, it is possible to sufficiently ensure the holding force of the cover 4 with respect to the shell 3, thereby preventing the cover 4 from being removed from the shell 3. According to the electrical connector 1 of the present disclosure, it is possible to reduce the insertion force required when the cover 4 is attached to the shell 3 with ensuring the holding force of the cover 4 with respect to the shell 3 as described above.

Further, the electrical connector 1 of the present disclosure is configured so that the housing 22 includes the pair of D-cut planes 225 and the pair of abutting surfaces 227 and the shell 3 includes the abutting portions 33. Therefore, the rotation of the housing 22 with respect to the shell 3 is prevented by the engagement between the pair of D-cut planes 225 and the inner surface of the abutting portion 33. Further, the positioning of the housing 22 with respect to the shell 3 in the Z direction is accurately performed by the abutment between the pair of abutting surfaces 227 and the base end surface of the abutting portion 33. With this configuration, it is possible to effectively prevent the buckling of the housing 22 (the receptacle assembly 2) in the insertion hole 32. Further, since the positioning of the housing 22 with respect to the shell 3 in the Z direction can be accurately performed, it is possible to significantly suppress allowable assembly errors that occur when the housing 22 (the receptacle assembly 2) is attached to the shell 3.

Further, the rotation of the housing 22 with respect to the shell 3 is prevented, and the positioning of the housing 22 with respect to the shell 3 is accurately performed, so that it is possible to reliably keep a separation distance, which is between the contact pin 21 press-fitted into the housing 22 and the shell 3 functioning as a ground, constant. As a result, it is possible to stabilize high-frequency signal transmission characteristics of the electrical connector 1.

Although the electrical connector of the present disclosure has been described with reference to the embodiment shown in the drawings, the present disclosure is not limited thereto. Each component of the present disclosure can be replaced with any component capable of performing the same function or any component can be added to each component of the present disclosure.

A person having ordinary skills in the art and the technique pertaining to the present disclosure may modify the configuration of the electrical connector of the present disclosure described above without meaningfully departing from the principle, the spirit and the scope of the present disclosure and the electrical connector having the modified configuration is also involved in the scope of the present disclosure.

In addition, the number and types of components of the electrical connector illustrated in the drawings are merely illustrative examples, and the present disclosure is not necessarily limited thereto. An aspect in which any component is added or combined or any component is omitted without departing from the principle and intent of the present disclosure is also involved within the scope of the present disclosure.

Figure 15:
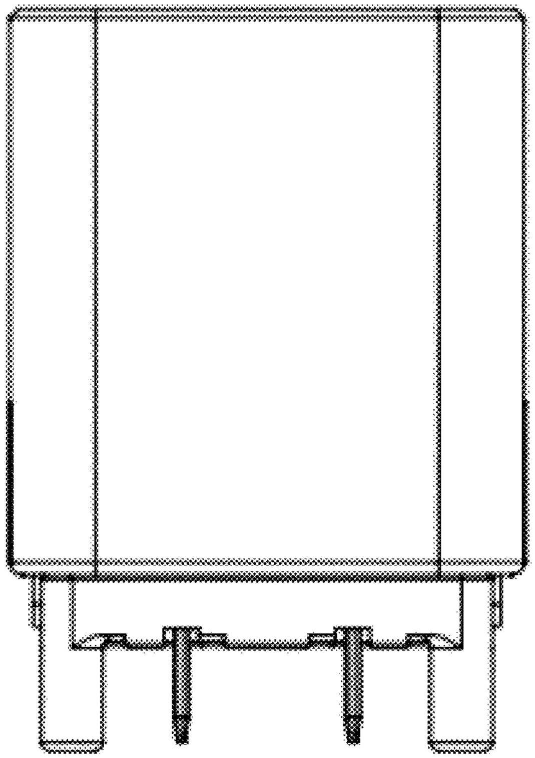
FIG. 15 is a planar view of the electrical connector of the present disclosure.
Figure 16:
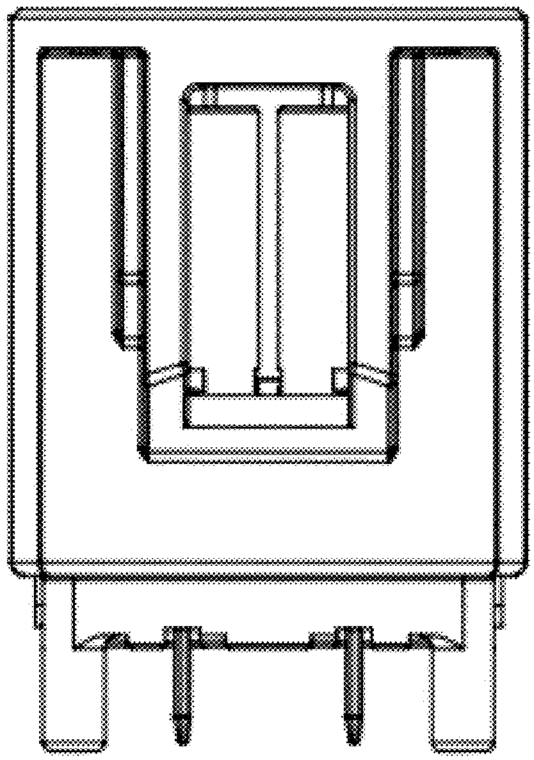
FIG. 16 is a bottom view of the electrical connector of the present disclosure.
Figure 17:
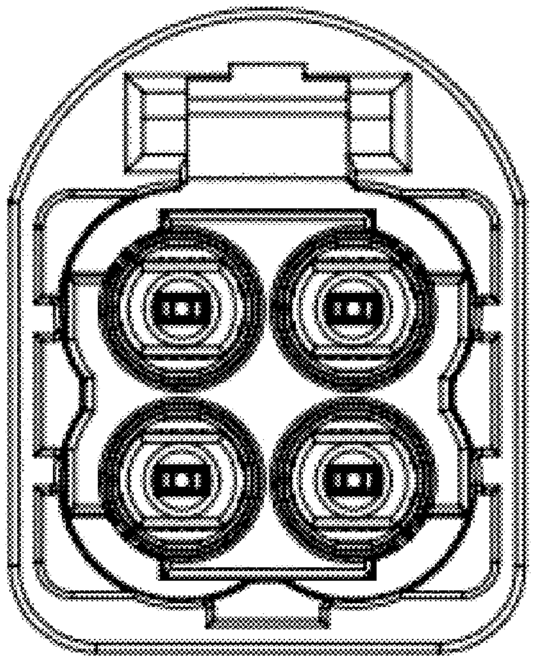
FIG. 17 is a front view of the electrical connector of the present disclosure.
Figure 18:
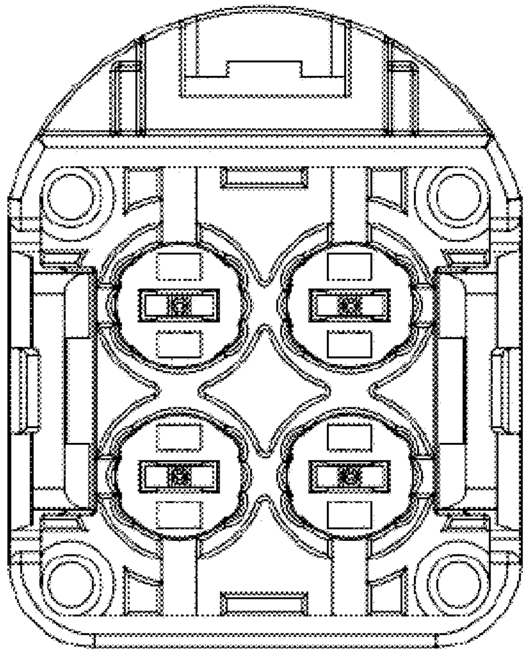
FIG. 18 is a rear view of the electrical connector of the present disclosure.
Figure 19:
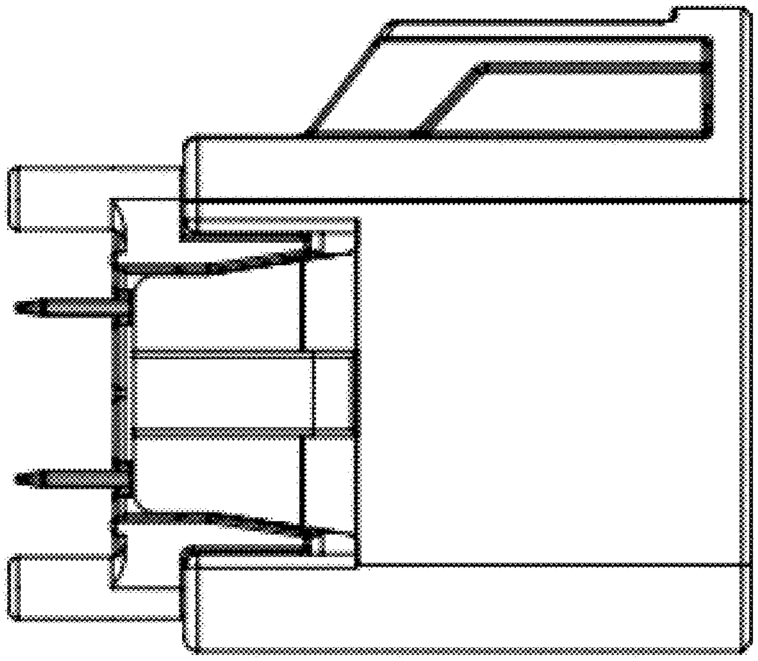
FIG. 19 is a left side view of the electrical connector of the present disclosure.
Figure 20:
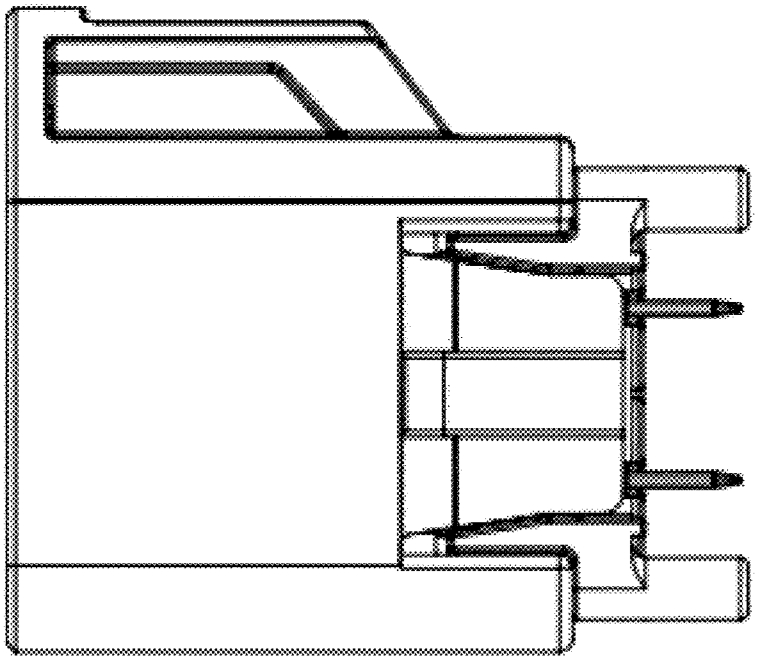
FIG. 20 is a right side view of the electrical connector of the present disclosure.

In addition, FIGS. 15 to 20 show six side views of the electrical connector according to the embodiment of the present disclosure for reference. FIG. 15 is a planar view of the electrical connector of the present disclosure. FIG. 16 is a bottom view of the electrical connector of the present disclosure. FIG. 17 is a front view of the electrical connector of the present disclosure. FIG. 18 is a rear view of the electrical connector of the present disclosure. FIG. 19 is a left side view of the electrical connector of the present disclosure. FIG. 20 is a right side view of the electrical connector of the present disclosure.

The invention claimed is:

1. An electrical connector which can be coupled with a mating connector inserted from a tip side, comprising:

a receptacle assembly including a contact pin, an insulating housing for containing the contact pin therein, and a metallic outer contact for covering the insulating housing;

a metallic shell for holding the receptacle assembly; and a cover attached to the metallic shell for guiding coupling between the electrical connector and the mating connector, wherein the metallic shell includes a body portion for holding the receptacle assembly and a pair of engagement recesses respectively formed on a pair of wall portions of the body portion, wherein the cover includes a body portion, a pair of protruding pieces respectively extending from a pair of wall portions of the body portion toward a base side and engagement protrusions respectively extending from the pair of protruding pieces toward an inner side, wherein the cover is attached to the metallic shell by respectively engaging the engagement protrusions of the cover with the pair of engagements recesses of the metallic shell, wherein each of the pair of protruding pieces of the cover has a thick portion and a thin portion whose thickness is thinner than a thickness of the thick portion, wherein the thick portion of the cover includes an upper thick portion linearly extending in an insertion and extraction direction of the mating connector and a lower thick portion linearly extending in the insertion and extraction direction of the mating connector and positioned on a lower side of the upper thick portion, and wherein the thin portion of the cover linearly extends in the insertion and extraction direction of the mating connector and is located between the upper thick portion and the lower thick portion in a height direction perpendicular to the insertion and extraction direction of the mating connector.

2. The electrical connector as claimed in claim 1, wherein the insulating housing of the receptacle assembly includes:

a cylindrical portion linearly extending in the insertion and extraction direction of the mating connector, a pair of opposed D-cut planes formed on an outer peripheral surface of the cylindrical portion, and a pair of abutting surfaces respectively located on the base side of the pair of D-cut planes and perpendicular to the insertion and extraction direction of the mating connector.

3. The electrical connector as claimed in claim 2, wherein the metallic shell further includes an insertion hole which passes through the body portion in the insertion and extraction direction of the mating connector and through which the receptacle assembly is passed and an abutting portion formed so as to extend from an inner surface of the insertion hole toward an inner side, wherein the pair of D-cut planes of the insulating housing of the receptacle assembly are engaged with an inner surface of the abutting portion of the metallic shell, and wherein the pair of abutting surfaces of the insulating housing of the receptacle assembly abut against a base end surface of the abutting portion of the metallic shell.

4. The electrical connector as claimed in claim 3, wherein the insulating housing has backlash-filling ribs formed at positions adjacent to the pair of abutting surfaces on the pair of D-cut planes so as to protrude toward an outer side, and wherein the backlash-filling ribs are compressed between the pair of D-cut planes and the inner surface of the abutting portion of the metallic shell.

5. The electrical connector as claimed in claim 4, wherein the backlash-filling rib has an inclined portion whose height gradually increases from the tip side toward the base side and a flat portion located on the base side of the inclined portion and having a constant height, and wherein the inclined portion and the flat portion are integrally formed so that an upper surface of a base end portion of the inclined portion and an upper surface of the flat portion are continuous.

6. The electrical connector as claimed in claim 3, wherein each of the pair of abutting surfaces of the insulating housing is a flat surface perpendicular to the insertion and extraction direction of the mating connector and directed toward the tip side.

7. The electrical connector as claimed in claim 1, wherein the pair of engagement recesses of the metallic shell are respectively formed on base side portions of the pair of wall portions of the body portion, and wherein the engagement protrusions of the cover are engaged with tip end surfaces of the pair of engagement recesses of the metallic shell by a snap fit, and thereby the cover is attached to the metallic shell.

8. An electrical connector which can be coupled with a mating connector inserted from a tip side, comprising:

a receptacle assembly including a contact pin, an insulating housing for containing the contact pin therein, and a metallic outer contact for covering the insulating housing;

a metallic shell for holding the receptacle assembly; and a cover attached to the metallic shell for guiding coupling between the electrical connector and the mating connector, wherein the metallic shell includes a body portion for holding the receptacle assembly and a pair of engagement recesses respectively formed on a pair of wall portions of the body portion, wherein the cover includes a body portion, a pair of protruding pieces respectively extending from a pair of wall portions of the body portion toward a base side and engagement protrusions respectively extending from the pair of protruding pieces toward an inner side, wherein the cover is attached to the metallic shell by respectively engaging the engagement protrusions of the cover with the pair of engagements recesses of the metallic shell, wherein each of the pair of protruding pieces of the cover has a thick portion and a thin portion whose thickness is thinner than a thickness of the thick portion, wherein the insulating housing of the receptacle assembly includes:

a cylindrical portion linearly extending in an insertion and extraction direction of the mating connector, a pair of opposed D-cut planes formed on an outer peripheral surface of the cylindrical portion, and a pair of abutting surfaces respectively located on the base side of the pair of D-cut planes and perpendicular to the insertion and extraction direction of the mating connector, wherein the metallic shell further includes an insertion hole which passes through the body portion in the insertion and extraction direction of the mating connector and through which the receptacle assembly is passed and an abutting portion formed so as to extend from an inner surface of the insertion hole toward an inner side, wherein the pair of D-cut planes of the insulating housing of the receptacle assembly are engaged with an inner surface of the abutting portion of the metallic shell, and wherein the pair of abutting surfaces of the insulating housing of the receptacle assembly abut against a base end surface of the abutting portion of the metallic shell.

* * * * *